United States Patent
Maeda et al.

(10) Patent No.: US 10,445,035 B2
(45) Date of Patent: Oct. 15, 2019

(54) CONTROL METHOD AND RECORDING MEDIUM

(71) Applicant: CANON KABUSHIKI KAISHA, Tokyo (JP)

(72) Inventors: Masao Maeda, Kawasaki (JP); Eiji Kadota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 15/490,207

(22) Filed: Apr. 18, 2017

(65) Prior Publication Data
US 2017/0308338 A1 Oct. 26, 2017

(30) Foreign Application Priority Data

Apr. 26, 2016 (JP) ................. 2016-088544
Apr. 26, 2016 (JP) ................. 2016-088545

(51) Int. Cl.
| | |
|---|---|
| G06F 3/12 | (2006.01) |
| H04N 1/00 | (2006.01) |
| H04W 12/06 | (2009.01) |
| H04L 29/08 | (2006.01) |
| H04L 29/06 | (2006.01) |
| H04W 84/12 | (2009.01) |
| H04W 76/30 | (2018.01) |
| H04W 76/10 | (2018.01) |

(52) U.S. Cl.
CPC .......... *G06F 3/1236* (2013.01); *G06F 3/1204* (2013.01); *G06F 3/1286* (2013.01); *G06F 3/1292* (2013.01); *H04L 63/083* (2013.01); *H04L 67/104* (2013.01); *H04N 1/00103* (2013.01); *H04N 1/00251* (2013.01); *H04N 1/00474* (2013.01); *H04W 12/06* (2013.01); *H04W 76/10* (2018.02); *H04W 76/30* (2018.02); *H04W 84/12* (2013.01); *H04N 2201/006* (2013.01); *H04N 2201/0039* (2013.01); *H04N 2201/0041* (2013.01); *H04N 2201/0055* (2013.01); *H04N 2201/0081* (2013.01); *H04N 2201/0082* (2013.01); *H04N 2201/0084* (2013.01)

(58) Field of Classification Search
None
See application file for complete search history.

(56) References Cited

U.S. PATENT DOCUMENTS

2009/0227282 A1* 9/2009 Miyabayashi ...... H04L 63/0492
455/552.1
2013/0324042 A1* 12/2013 Shinomiya ............ H04W 40/24
455/41.1

(Continued)

FOREIGN PATENT DOCUMENTS

JP          2014-36292 A       2/2014

*Primary Examiner* — Natisha D Cox
(74) *Attorney, Agent, or Firm* — Canon U.S.A., Inc., IP Division

(57) ABSTRACT

A terminal device stores, without accepting user input of predetermined connection information, predetermined connection information without acquiring the predetermined connection information from a communication device, connects to the communication device using the stored predetermined connection information, and communicates with the communication device using the predetermined connection information.

19 Claims, 18 Drawing Sheets

(56) References Cited

U.S. PATENT DOCUMENTS

| | | | | |
|---|---|---|---|---|
| 2014/0052993 A1* | 2/2014 | Isozaki | ............... | H04L 63/0428 |
| | | | | 713/175 |
| 2014/0094117 A1* | 4/2014 | Rajendran | ......... | H04W 12/0023 |
| | | | | 455/41.1 |
| 2015/0169269 A1* | 6/2015 | Ueda | ..................... | G06F 3/1236 |
| | | | | 358/1.15 |
| 2016/0255218 A1* | 9/2016 | Takahashi | .......... | H04N 1/00323 |
| | | | | 358/1.15 |
| 2017/0123739 A1* | 5/2017 | Konji | .................... | G06F 3/1236 |
| 2017/0202035 A1* | 7/2017 | Yokoyama | ......... | H04N 1/00315 |

* cited by examiner

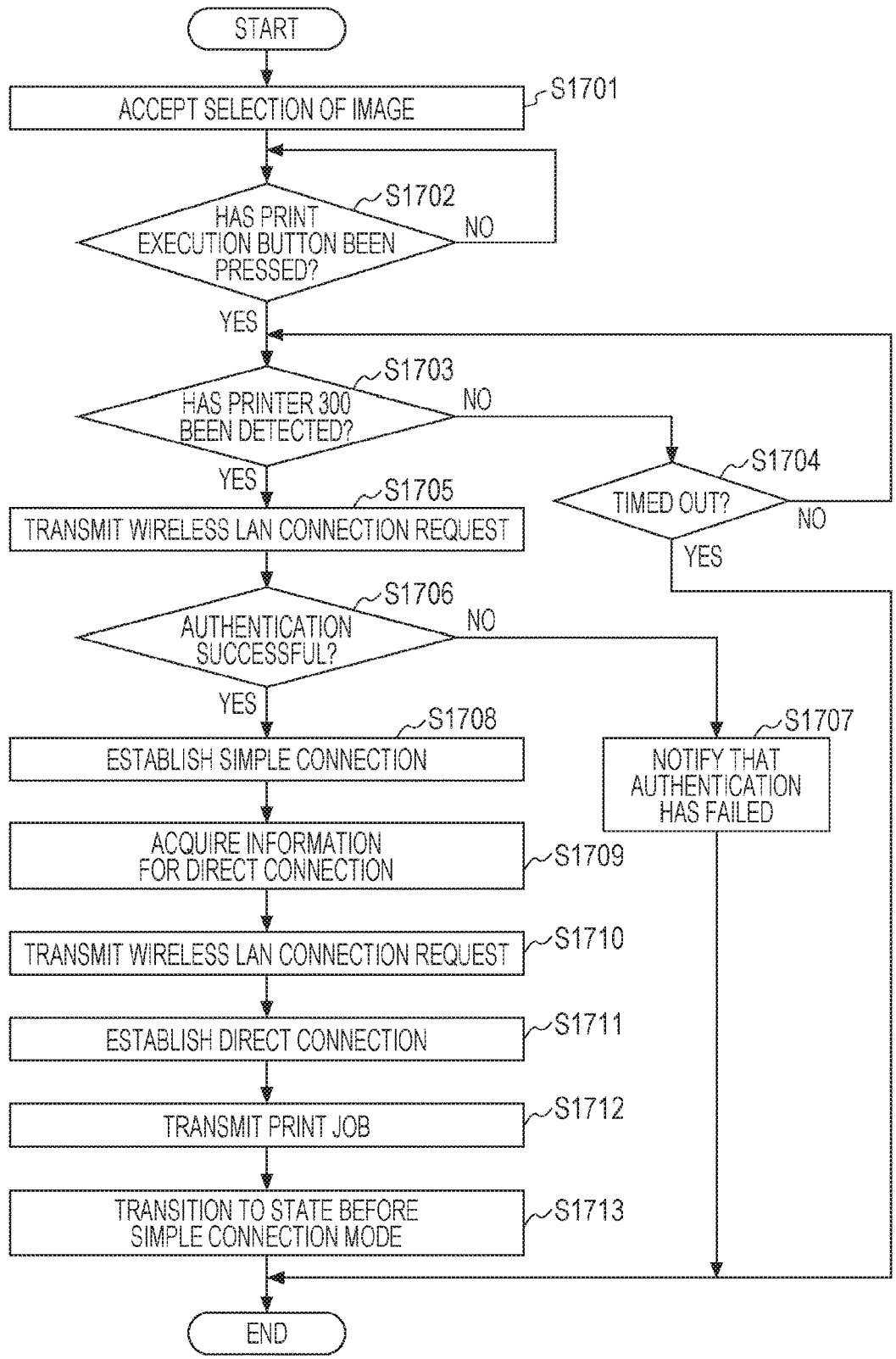

CONTROL METHOD AND RECORDING MEDIUM

BACKGROUND

Field

The present disclosure relates to a control method and a recording medium.

Description of the Related Art

There is known a communication system where a terminal device such as a camera and a communication device such as a printer execute communication of image data. In order to execute communication of image data in such a communication system, communication first needs to be established between devices by a communication method such as wireless local area network (LAN) communication or the like. Japanese Patent Laid-Open No. 2014-36292 discloses a mobile terminal requiring a user to select an access point to connect to and inputting a password. Once the user inputs the necessary information and provides an instruction to start connection, connection processing to the access point is started. However, the arrangement such as in Japanese Patent Laid-Open No. 2014-36292, where an inter-device connection is established and communication of image data is executed, is problematic in that the user is required to perform troublesome operations such as input of connection information and so forth.

SUMMARY

It has been found desirable to improve user operability of operations to execute communication of image data between a communication device and a terminal device.

A control method of a terminal device that accepts operations from a user stores, without accepting user input of predetermined connection information and without acquiring the predetermined connection information from a communication device, the predetermined connection information, communicates with a communication device using the stored predetermined connection information includes connecting the terminal device and the communication device using the stored predetermined connection information, and communicating, after connection of the terminal device and the communication device, image data with the communication device, where the stored predetermined condition includes at least information that the user cannot optionally change.

Further features will become apparent from the following description of exemplary embodiments with reference to the attached drawings.

BRIEF DESCRIPTION OF THE DRAWINGS

FIG. 17 is a flowchart illustrating processing executed by the terminal device according to the third embodiment.

DESCRIPTION OF THE EMBODIMENTS

Exemplary embodiments will be described with reference to the drawings. It should be understood that one skilled in the art will be able to make various modifications and improvements to the below-described embodiments without departing from the spirit and scope of the present disclosure, and that such modifications and improvements are also encompassed by the scope of the described embodiments.

First Embodiment

A terminal device and communication device according to a first embodiment will be described. While a digital camera is exemplified in the present embodiment as the terminal device, this is not restrictive. Various items can be used as the terminal device as long as communicable with a later-described communication device. Applicable examples include smartphones, mobile terminals, laptop computers, tablet terminals, personal digital assistants (PDAs), music player devices, and so forth. While a printer is exemplified in the present embodiment as the communication device, this is not restrictive. Various items can be used as the communication device as long as communicable with the terminal device. Applicable examples of printers include ink-jet printers, full-color laser beam printers, monotone printers, and so forth. Applicable examples other than printers include multifunction devices including copy, facsimile, and printing functions, copy machines, facsimile devices, smartphones, mobile terminals, laptop computers, tablet terminals, PDAs, digital cameras, music player devices, storage devices, and so forth.

Figure 1:
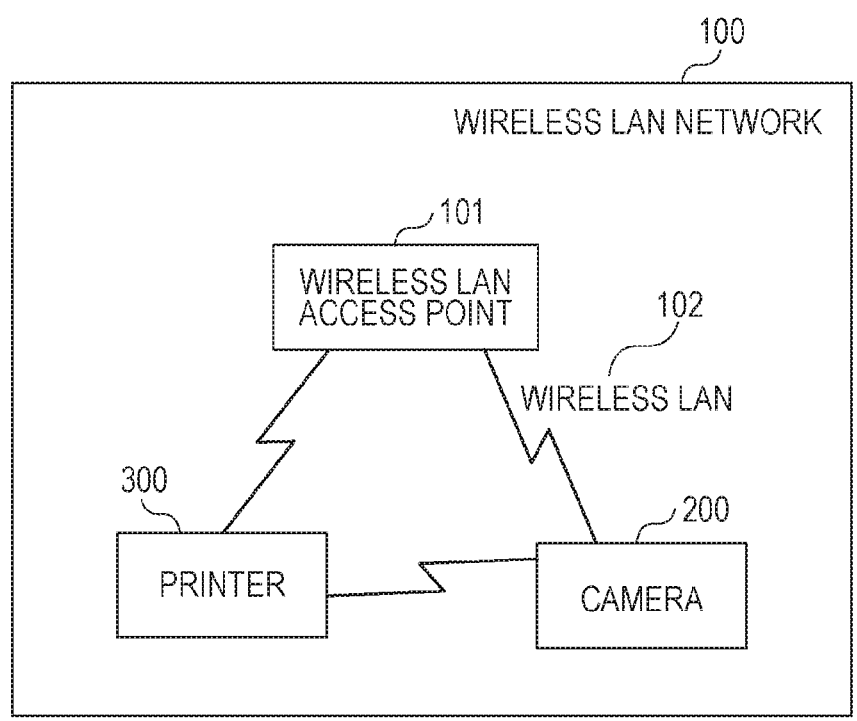
FIG. 1 is a diagram illustrating the configuration of a print processing system according to embodiments.

FIG. 1 is a diagram illustrating the configuration of a print processing system according to the present embodiment.

This system includes a wireless LAN network 100, an access point 101 connectable to the wireless LAN network 100, and a camera 200 and printer 300.

The camera 200 is the terminal device in the present embodiment. The printer 300 is the communication device in the present embodiment. The printer 300 and camera 200 communicate with each other by wireless LAN connection via the access point 101, which is external to each device. The printer 300 and camera 200 can also each enable an internal access point, and thus each device can act as an access point. For example, the camera 200 and printer 300 can perform direct wireless LAN connection without going through the access point 101, by one of device acting as an access point and the other device connecting to this access point. The camera 200 and printer 300 also include wireless LAN functions, and thus can perform peer-to-peer (hereinafter "P2P") communication following performance of authentication processing.

In a case of acting as access points, the devices form a wireless LAN, and periodically transmit a beacon. A device that is a communication partner, upon acquiring the beacon, recognizes the device transiting the beacon, and joins the wireless LAN that has been formed, thus enabling wireless LAN communication between the devices. In a case of acting as access points, the devices decide channels to be used for wireless communication, and perform authentication processing of connection information (passwords, etc.) transmitted from the device that is the communication partner.

Figure 2:
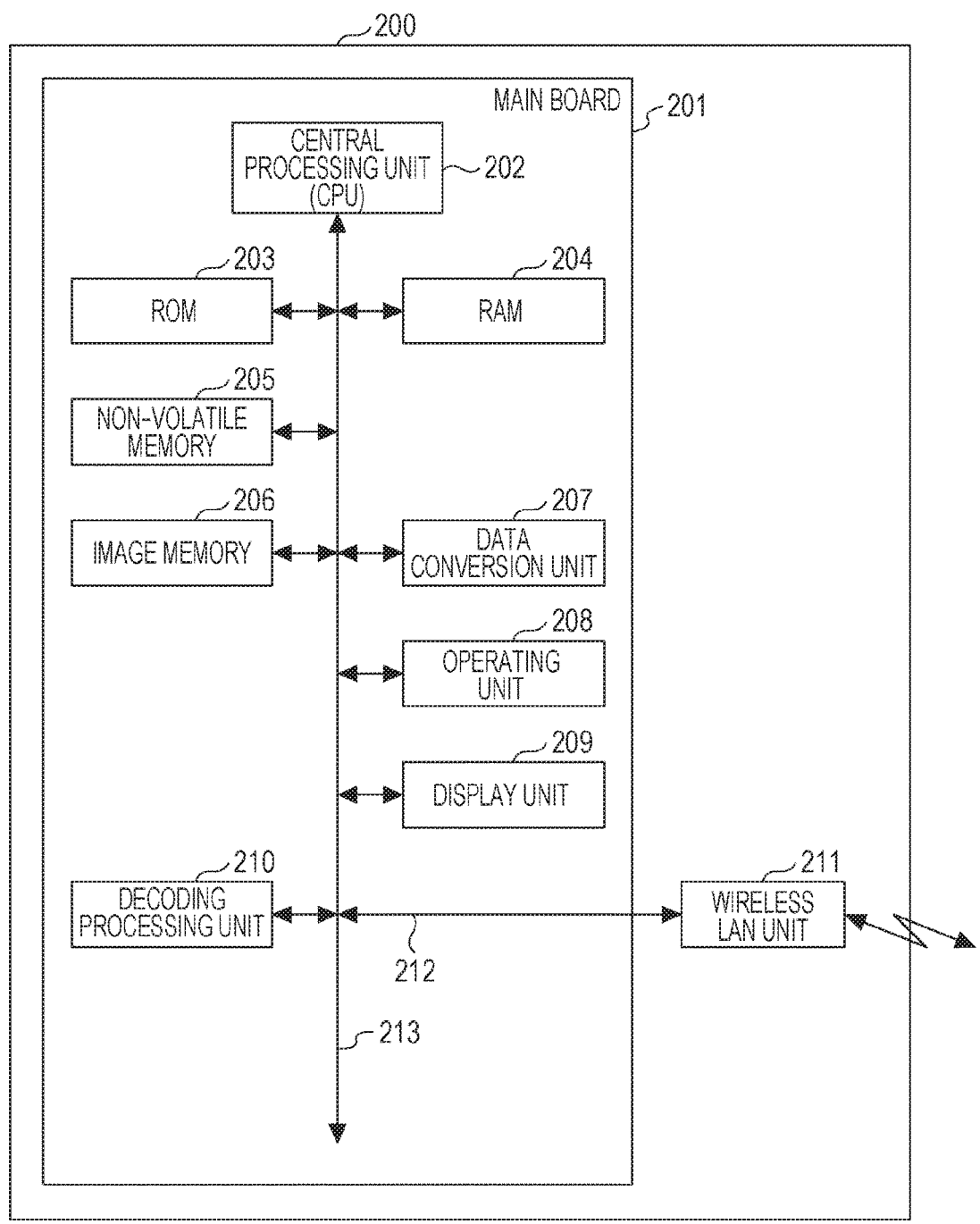
FIG. 2 is a block diagram illustrating the configuration of a terminal device according to embodiments.

FIG. 2 is a block diagram illustrating a schematic configuration of the camera 200. The camera 200 includes a main board 201, where a CPU 202 that controls the camera 200 is provided on the main board 201. Read-only memory (ROM) 203 stores various types of control programs and embedded operating system (hereinafter "OS") programs that the CPU 202 executes or the like. Control programs according to the present embodiment that are stored in the ROM 203 perform software control such as scheduling and task switching under control of an embedded OS stored in the ROM 203. Random access memory (RAM) 204 includes memory such as static RAM (SRAM) or the like, and stores program control variables, settings values registered by the user, management data for the camera 200, and so forth. A buffer region serving as workspace for various processes is provided in the RAM 204. Settings information data can be stored in another storage region such as the ROM 203 or non-volatile memory 205, instead of in the RAM 204.

The non-volatile memory 205 includes memory such as flash memory, and stores data that the user desires to be held even when the camera's 200 power is turned off. Specifically, the non-volatile memory 205 stores network information such as network information like passwords to connect to a network and authentication information and so forth, a list of communication devices with which connection had previously been made, in the form of media access control (MAC) addresses, service set identifiers (SSIDs), and so forth, and other such settings information of the camera 200. Connection information for a later-described simple connection mode is also stored in the non-volatile memory 205 in the present embodiment. Such data can be stored in another storage region such as the ROM 203 or RAM 204 instead of the non-volatile memory 205. Processing can also be performed, using the stored data, by the CPU 202 loading the settings information stored in the ROM 203 and non-volatile memory 205 to the RAM 204.

The image memory 206 includes memory such as dynamic RAM (DRAM), and stores various types of data, such as image data received via a wireless LAN unit 211 or the like, image data processed at a decoding processing unit 210, and so forth. Image data generated by images being taken by an imaging unit (omitted from illustration) of the camera 200 also stored in the image memory 206.

The memory configuration of the camera 200 is not restricted to the arrangement described above, and the number, properties, storage capacity, and so forth, can be changed as appropriate in accordance with usage and purpose. For example, the image memory 206 and RAM 204 can share the same hardware. While the image memory 206 has been described as including DRAM or the like, this is not restrictive and can include a hard disk drive (hereinafter "HDD"), non-volatile memory, or the like.

A data conversion unit 207 generates data such as page description language (PDL) data or the like, and performs data conversion on image data such as color conversion, image conversion, and so forth. An operating unit 208 and a display unit 209 accept various types of input to the camera 200, and display various types of information relating to the camera 200. The decoding processing unit 210 performs various types of processing on image data, such as decoding processing, enlarging/reducing processing, and so forth.

The wireless LAN unit 211 is a unit to realize wireless LAN communication that conforms to a standard such as Wi-Fi® or the like. The wireless LAN unit 211 enables functions to establish a wireless LAN connection, such as beacon detection processing, authentication processing, transmission of print jobs to a communication device with which a wireless LAN connection has been established, and so forth. The wireless LAN unit 211 is connected to a system bus 213 via a bus cable 212. The CPU 202 can control the wireless LAN unit 211 to operate as an access point within the camera 200. In the present embodiment, the camera 200 transmits print jobs via the wireless LAN unit 211 to the printer 300 for printing. The above-described components denoted by reference numerals 202 through 212 are mutually connected via the system bus 213 under the control of the CPU 202.

The camera 200 can include a communication unit other than the wireless LAN unit 211. The camera 200 can include multiple communication units and communicate using multiple types of communication formats. Communication can be performed directly by wireless communication or can be performed via an access point external to the camera 200. Examples of communication formats include, for example, Bluetooth®, Near Field Communication (NFC) defined by ISO/IEC 18092, Wi-Fi Aware™, and so forth. Communication is not restricted to wireless communication, and wired communication can be used.

Figure 3:
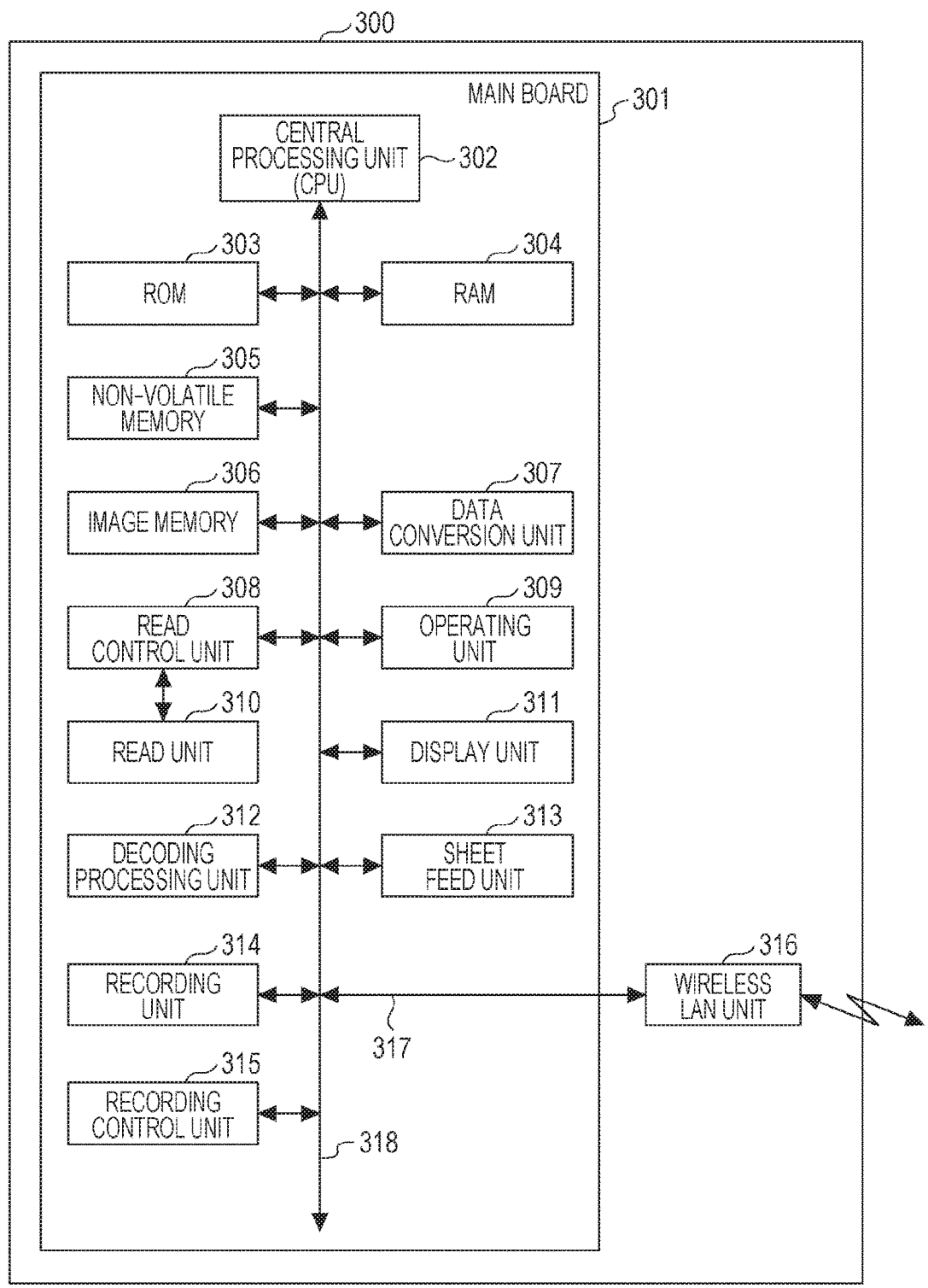
FIG. 3 is a block diagram illustrating the configuration of a communication device according to embodiments.

FIG. 3 is a block diagram illustrating a schematic configuration of the printer 300. The printer 300 includes a main board 301, which includes a CPU 302 that is a system control unit that controls the printer 300. ROM 303 stores various types of control programs and embedded OS programs and so forth that the CPU 302 executes. Control programs according to the present embodiment that are stored in the ROM 303 perform software control such as scheduling and task switching under control of an embedded OS stored in the ROM 303. RAM 304 includes memory such as SRAM or the like, and stores program control variables, settings values registered by the user, management data for the printer 300, settings information for mode changing conditions which will be described below, and so forth. A buffer region serving as workspace for various processes is provided in the RAM 304. Such settings information data can be stored in another storage region such as the ROM 303 or non-volatile memory 305, instead of in the RAM 304.

The non-volatile memory 305 includes memory such as flash memory, and stores data that the user desires to be held even when the printer's 300 power is turned off. Specifically, the non-volatile memory 205 stores network information such as network information like passwords to connect to a network and authentication information and so forth, a list of external devices with which connection has previously been made, in the form of MAC addresses, SSIDs, and so forth, menu items such as printing mode and so forth, recording head correction information, and other such settings information of the printer 300. Such setting information can be stored in another storage region such as the ROM 303 or RAM 304 instead of the non-volatile memory 305. Processing can be performed using the setting information by the CPU 302 loading the settings information stored in the ROM 303 and non-volatile memory 305 to the RAM 304.

The image memory 306 includes memory such as DRAM, and stores various types of data, such as image data accepted via a wireless LAN unit 316 or the like, image data processed at a decoding processing unit 312, and so forth.

The memory configuration of the printer 300 is not restricted to the arrangement described above, and the number, properties, storage capacity, and so forth, can be changed as appropriate in accordance with usage and purpose. For example, the image memory 306 and RAM 304 can share the same hardware. While the image memory 306 has been described as including DRAM or the like, this is not restrictive and can include an HDD, non-volatile memory, or the like.

A data conversion unit 307 performs various types of image processing on image data included in jobs received by the printer 300, such as smoothing processing, recording density correction processing, color correction, and so forth, by an image processing control unit (omitted from illustration). The data conversion unit 307 performs such processing to convert image data to be printed into high-resolution print data, and outputs the converted print data to a recording unit 314.

A read unit 310 optically reads an original document by a contact image sensor (CIS) or the like. A read control unit 308 subjects image signals read by the read unit 310 to various types of image processing, such as binarization processing, half-tone processing, and so forth, thereby outputting high-resolution image data.

An operating unit 309 and a display unit 311 accept various types of input to the printer 300, and display various types of information relating to the printer 300. The decoding processing unit 312 performs various types of processing on image data, such as decoding processing, enlarging/reducing processing, and so forth. A sheet feed unit 313 stores a recording medium for printing, and supplies the recording medium to the recording unit 314 under control of a recording control unit 315. The sheet feed unit 313 includes multiple sheet feeding cassettes.

The recording control unit 315 controls which of the multiple sheet feeding cassettes sheet feeding is performed from. The recording control unit 315 also serves to update information in the RAM 304, by periodically reading out various types of information, such as status information and so forth of the recording unit 314. Specifically, the recording control unit 315 updates the status of the device, such as, for example, whether in use, sleeping, an error has occurred, or the like, and information such as the remaining amount of ink in an ink tank, and so forth.

The recording unit 314 performs image formation processing (print processing) to form an image on the recording medium by a recording material such as ink or the like, based on print data and print setting information included in the print job output from the data conversion unit 307.

The wireless LAN unit 316 enables wireless LAN communication conforming to a standard such as Wi-Fi® or the like. The wireless LAN unit 316 enables functions via a wireless LAN connection such as connection information transmission processing, authentication processing, reception of print jobs from a terminal device with which a wireless LAN connection has been established, and so forth. The wireless LAN unit 316 is connected to a system bus 318 via a bus cable 317. The CPU 302 can control the wireless LAN unit 316 to operate as an access point within the printer 300. The above-described components denoted by reference numerals 302 through 317 are mutually connected via the system bus 318 under the control of the CPU 302.

The printer 300 can include a communication unit other than the wireless LAN unit 316. Communication can be performed directly by wireless communication or can be performed via an access point external to the printer 300. Examples of communication formats include Bluetooth®, NFC, Wi-Fi Aware™, and so forth. Communication is not restricted to wireless communication, and wired communication by a wired LAN or the like can be used. The printer 300 accepts jobs from other external devices, such as the camera 200 and so forth, via a network using such communication formats.

Figure 4A:
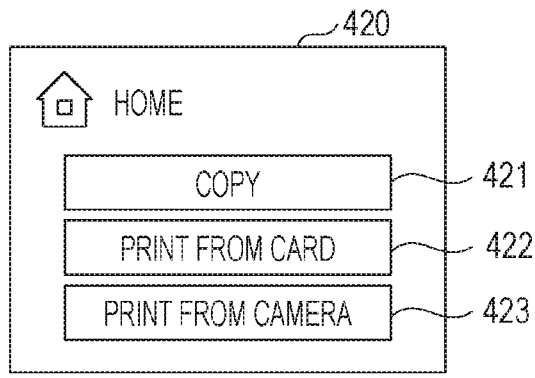
FIGS. 4A through 4C are diagrams illustrating an example of an operation screen of a communication device according to embodiments.
Figure 4B:
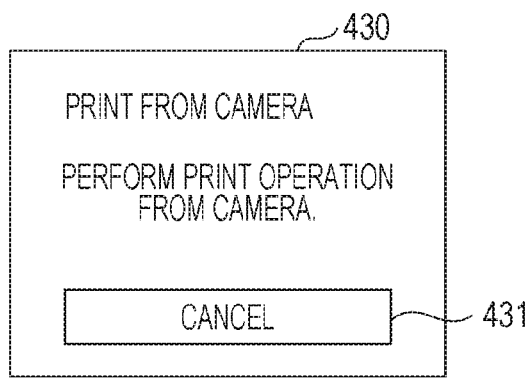
Figure 4C:
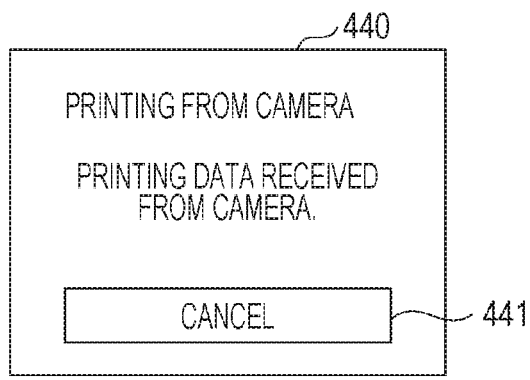

FIGS. 4A through 4C are diagrams illustrating examples of operating screens of the printer 300 displayed on the display unit 311. FIG. 4A illustrates a screen from which a function to be executed by the printer 300 is selected. This is a home screen 420 that stands by for user operations of the printer 300. The home screen 420 includes a copy button 421, a print-from-card button 422, and a print-from-camera button 423. The copy button 421 is a button causing the printer 300 to perform copying processing, which is a process for reading an original document positioned on a document table (omitted from illustration), using the read unit 310, and print the read image data. The print-from-card button 422 is a button causing the printer 300 to print image data from a memory card inserted in a card insertion slot (omitted from illustration). The print-from-camera button 423 is a button causing the printer 300 to print image data received from the camera 200.

FIG. 4B illustrates a print-from-camera standby screen 430. The print-from-camera standby screen 430 is displayed on the display unit 311 in a case where the printer 300 enters a standby state for a print job from the camera 200 based on selection of the print-from-camera button 423. The print-from-camera standby screen 430 displays a message prompting the user to perform a print operation from the camera 200 and a cancel button 431. If the cancel button 431 is pressed, the printer 300 ends printing of image data received from the camera 200, and displays the home screen 420 again.

FIG. 4C illustrates a printing-from-camera screen 440. The printing-from-camera screen 440 is displayed on the display unit 311 when the printer 300 receives a print job from the camera 200 and executes printing. The printing-from-camera screen 440 displays a message indicating that a print job received from the camera 200 is being executed and a cancel button 441. If the cancel button 441 is pressed, the printer 300 cancels the print job processing being executed, and displays the home screen 420 on the display unit 311 again.

Figure 5:
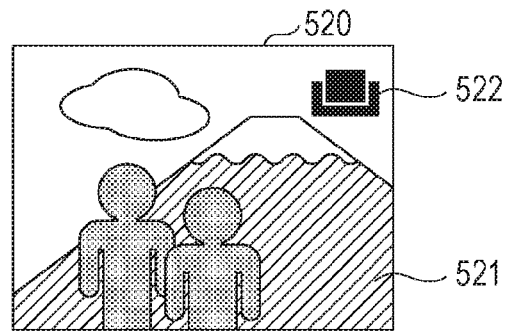
FIG. 5 is a diagram illustrating an example of an operation screen of a terminal device according to embodiments.

FIG. 5 illustrates an image display screen 520 on the display unit 209. The image display screen 520 is displayed on the display unit 209 in a case where an image has been selected from an image selection screen, from which images are selected to be printed by the printer 300. An acquired image 521 is displayed on the image display screen 520 over the entire operating screen with a print execution button 522 displayed therein. When the print execution button 522 is pressed, the camera 200 can transmit a print job to print the image displayed on the image display screen 520 to the printer 300. While a print job typically includes image data, print setting information, rendering commands, and other such information, an arrangement can be made where only image data is transmitted as the print job.

Figure 6:
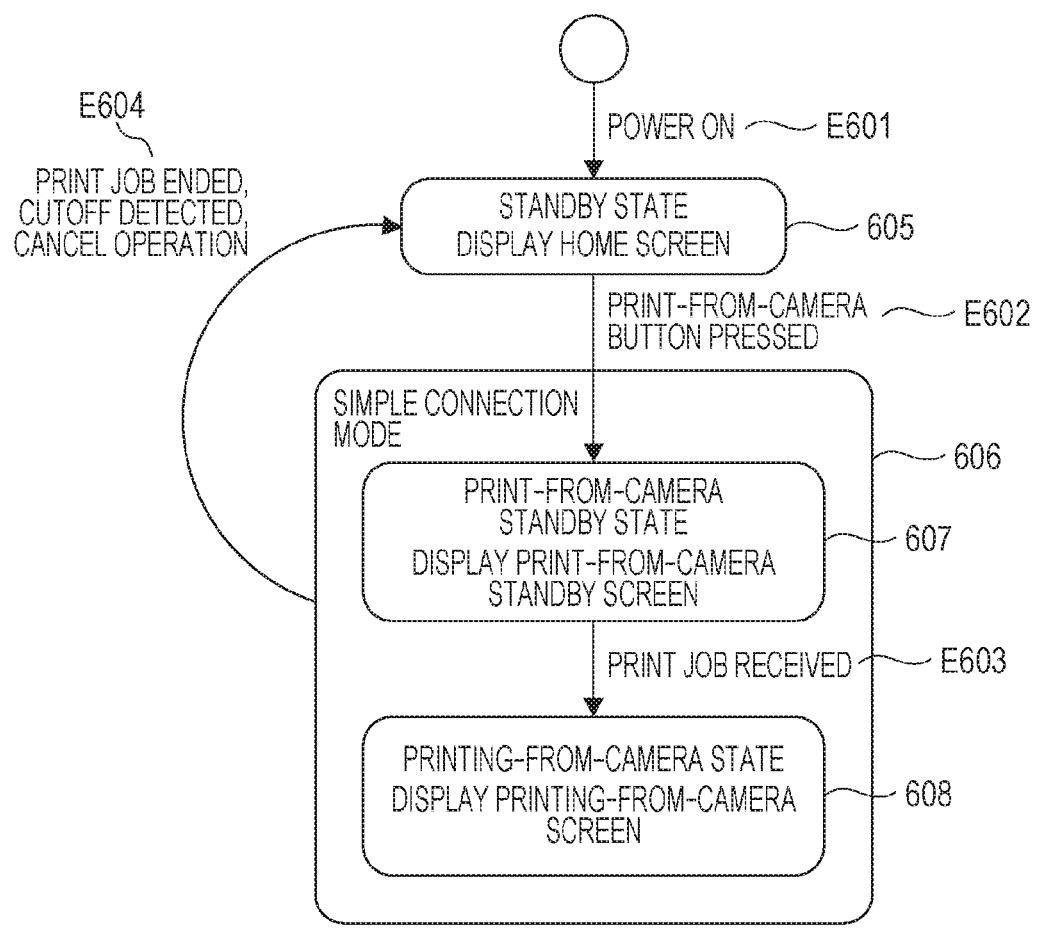
FIG. 6 is a state transition diagram of a communication device according to embodiments.

FIG. 6 is a diagram illustrating state transition of the printer 300. First, with the printer 300 in an initial state (power off state), in a case where an event E601 occurs, the printer 300 transitions to a standby state 605. In the present embodiment, the event E601 is pressing of printer's 300 power switch (omitted from illustration).

Upon the printer 300 transitioning to the standby state 605, the home screen 420 is displayed on the display unit 209. In a case where an event E602 occurs in this state, the printer 300 enables the access point within the printer 300, and transitions to a simple connection mode 606. In the present embodiment, the event E602 is pressing of the print-from-camera button 423 (a communication instruction for image data is accepted). The access point enabled here and the simple connection mode will be described in detail below.

The simple connection mode 606 includes sub-states, which are a print-from-camera standby state 607 and a printing-from-camera state 608. Thus, a communication instruction for image data serves as a trigger to transmit a print job. Upon transitioning to the simple connection mode 606, the printer 300 first transitions to the print-from-camera standby state 607, which is a sub-state. Upon transition by the printer 300 to the print-from-camera standby state 607, the print-from-camera standby screen 430 is displayed on the display unit 209. In a case where an event E603 occurs in this state, the printer 300 transitions to the printing-from-camera state 608. In the present embodiment, the event E603 is receipt of a print job from the camera 200.

When the printer 300 transitions to the printing-from-camera state 608, the printing-from-camera screen 440 is displayed on the display unit 209. In a case where an event E604 occurs in this state, the printer 300 transitions to the standby state 605 and disables the access point. In the present embodiment, the event E604 is detection of one of completion of the print job processing, cutoff of the wireless LAN connection with the camera 200, or a cancel operation by the user.

The above description is of the flow of state transition of the printer 300 in a case where the printer 300 performs printing based on a print job transmitted from the camera 200. In a state where the home screen 420 is displayed on the display unit 209, the printer 300 executes various types of functions by transitioning to states omitted from illustration, upon acceptance of various types of operations, unrestricted to the copy button 421 and print-from-card button 422. Transition to the states omitted from illustration will be omitted from description here.

Processing performed by the printer 300 and the camera 200 in the present embodiment will be described with reference to FIGS. 7 through 9. FIG. 9 is a sequence diagram processing where simple connection is performed between the printer 300 and camera 200 to print an image. The processes executed by the devices in this sequence diagram are realized by CPUs provided to the devices reading out various types of programs, stored in memory provided to the devices, to RAM provided to the devices, and executing the programs.

First, in S901, a user 500 operates the printer 300 and presses the print-from-camera button 423 in the home screen 420 displayed on the display unit 311. In S902, the printer 300 transitions to the simple connection mode based on the user 500 pressing the print-from-camera button 423. The simple connection mode is a mode where the printer 300 operates as a connectable access point by fixed connection information (a fixed SSID, a fixed password, etc.) previously determined for the simple connection mode. The fixed connection information is previously stored in the camera's 200 memory (ROM 203, etc.) before the first activation of the camera 200. That is, the camera 200 stores the connection information for the simple connection mode without having to acquire connection information from the connection partner (the device to which data is to be transmitted) or accepting input from the user.

The camera 200 stores a first activation flag, which is information indicating whether the camera 200 was ever previously activated after having been shipped from the manufacturer, in the camera's 200 memory (ROM 203, etc.). A shipping state (before first activation) is a state where the first activation flag indicates that the camera 200 had not ever been activated after having been shipped from the manufacturer. The fixed connection information for simple connection mode is previously stored in the camera 200 as well as previously stored in each terminal device of each model including functions of communication with the printer 300, prior tore the first activation of each terminal device. The camera 200 can perform wireless communication with the printer 300 without having to acquire connection information from the connection partner (the device to which data is to be transmitted) or accepting input from the user, by connecting using the fixed connection information.

Since the connection information for simple connection mode in the present embodiment is previously stored in the camera's 200 memory, as described above, the user cannot optionally modify the connection information. Not all information included in the connection information for simple connection mode needs to be fixed. That is, it is sufficient for the connection information for simple connection mode to at least partially include fixed information where the camera 200 and printer 300 are identifiable. In this case, the connection information that need not be fixed can be changeable. The printer 300 performs the below-described authentication processing referencing the fixed information out of the connection information for simple connection mode. The camera 200 also performs detection of the printer 300, described below, referencing the fixed information out of the connection information for simple connection mode.

Since any mode will suffice as the simple connection mode as long as the printer 300 can connect with the camera 200 without requiring the user to perform troublesome operations, the SSID for simple connection mode does not have to be a fixed SSID. In addition, it also does not have to have been previously stored in the camera 200. For example, the SSID for simple connection mode can be an SSID for a free access point that can be accessed without a password. In this case, the printer 300 in the simple connection mode operates as a free access point that can be accessed without a password. Accordingly, a process where the camera 200 causes the user to select an access point to connect to is required, but input of a password can be omitted.

Upon starting operations as an access point with an SSID for simple connection mode, the printer 300 starts emitting a beacon including connection information, such as the SSID for simple connection mode, and so forth. Accordingly, the camera 200 can receive the beacon and recognize that there is a nearby printer 300 in the simple connection mode. Before transitioning to the simple connection mode, the printer 300 performs storage control processing to store information of the connection mode of the printer 300 at that time in the non-volatile memory 305 or the like. Information of the connection mode is information relating to the connection status of the printer 300 at that time. Examples include device information of the connection partner, connection information for reconnecting to the connection partner, connection mode name, and so forth. Examples of connection modes include a wired LAN connection mode where communication is performed over a wired LAN, an infrastructure connection mode where communication is performed with a terminal device via an access point external to the printer 300, a direct connection mode where P2P communication is performed with a device external to the printer 300, and so forth.

In S903, the user 500 operates the camera 200 by pressing a print execution button 522 in the image display screen 520 displayed on the display unit 209. That is, the user 500 selects an image for the printer 300 to print, and specifies for the printer 300 to execute printing.

Next, in S904, the camera 200, based on selection of print execution button 522, performs a wireless LAN connection with the printer 300 using connection information for simple connection mode. Specifically, the camera 200 first detects the beacon emitted from the printer 300, references device information included in the beacon, and recognizes that a printer 300 in the simple connection mode is present nearby.

Thereafter, the camera 200 uses the connection information for simple connection mode to transmit a wireless LAN connection request to the printer 300, and if authentication is successful, establishes a wireless LAN connection with the printer 300. Thus, a wireless LAN connection is established where the printer 300 in simple connection mode serves as an access point and the camera 200 serves as a wireless LAN client. Note that in a case where the camera 200 cannot detect the beacon being emitted from the printer 300 in S904, detection operations can be repeated for a certain period of time. Accordingly, the camera 200 can still connect to the printer 300 even in a case where the processing of S904 is performed before S901. Before connecting to the printer 300, the camera 200 stores the connection mode of the camera 200 and information of the connection partner at that time (device information of the connection partner, connection information for reconnecting to the connection partner, etc.) in the non-volatile memory 205 or the like.

Next, in S905, the camera 200 transmits a print job to the printer 300. The print job transmitted at this time includes image data of the image selected by the user 500, print setting information set by the user 500, and so forth. Then, in S906, the printer 300 executes print processing based on the received print job.

Upon completion of the print processing, in S907, the printer 300 notifies the camera 200 that the print processing completed. Upon receipt by the camera 200 of the notification and recognition that the print processing has completed, in S908, the camera 200 cuts off the wireless LAN connection.

Next, in S909, the printer 300 returns to the connection state before transitioning to the simple connection mode, using the information stored before transitioning to the simple connection mode. Accordingly, the printer 300 ceases to operate as an access point with an SSID for simple connection mode. In S910, the camera 200 returns to the connection state before connection to the printer 300, using the information saved before connecting to the printer 300.

While the above-provided description has discussed the printer 300 releasing the simple connection mode in a case where the connection with the camera 200 has been cut off, the simple connection mode can be released by other conditions. For example, the simple connection mode can be released in a case where the print processing ends in S906. Alternatively, the camera 200 can explicitly transmit an instruction to release the simple connection mode at any timing after transmission of the print job has ended, and the printer 300 can release the simple connection mode based on the instruction.

In yet another case, an operation is made at the printer 300 in S901 and the printer 300 has transitioned to the simple connection mode, but no operation is made at the camera 200 (the processing in S902) for an extended period of time. Accordingly, the printer 300 can automatically release the simple connection mode in a case where connection with the camera 200 is not performed even though a predetermined amount of time has elapsed. Moreover, the printer 300 can release the simple connection mode at the timing of receipt of the print job having completed to reduce the time operating in the simple connection mode as much as possible.

Figure 7:
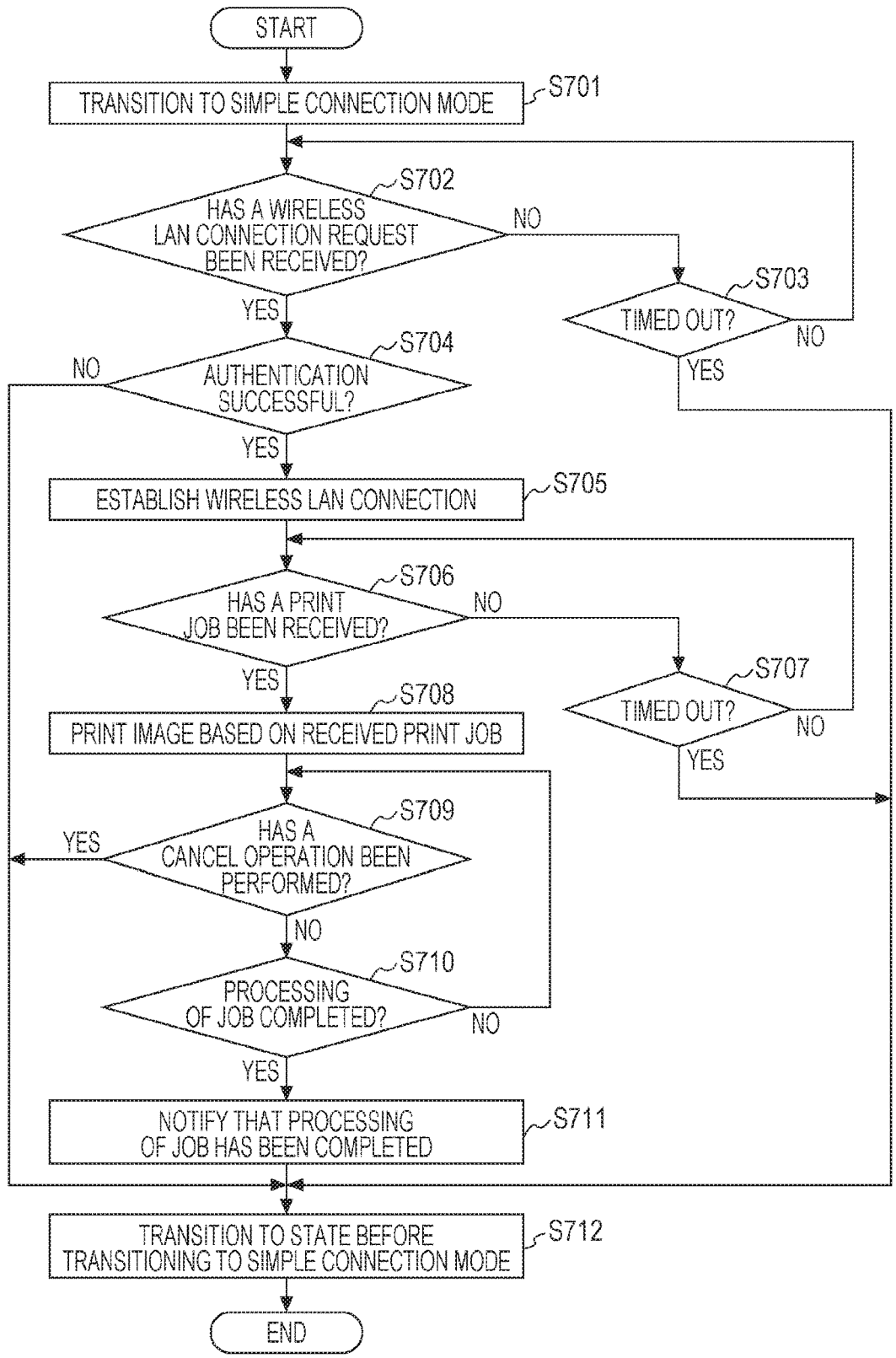
FIG. 7 is a flowchart illustrating processing executed by a communication device according to a first embodiment.

FIG. 7 is a flowchart illustrating processing that the printer 300 executes when the printer 300 and camera 200 connect by simple connection. The processing illustrated in this flowchart is realized by the CPU 302 reading out various types of programs stored in memory such as the ROM 303 to the RAM 304 and executing the programs. The processing in this flowchart is started in a case where the CPU 302 detects selection of the print-from-camera button 423 displayed on the display unit 311.

In S701, the CPU 302 transitions the printer 300 to the simple connection mode. Specifically, the CPU 302 causes the printer 300 to operate as a connectable access point by fixed connection information for simple connection mode previously determined. The CPU 302 stores, in the non-volatile memory 305 or the like, information of the connection mode and the connection partner at that time, immediately before transitioning to the simple connection mode.

In S702, the CPU 302 determines whether a wireless LAN connection request has been received from the camera 200. In a case of determining that a wireless LAN connection request has been received from the camera 200, the CPU 302 performs the processing of S704. In a case of determining that a wireless LAN connection request has not been received from the camera 200, the CPU 302 determines in S703 whether a predetermined amount of time has elapsed after having transitioned the printer 300 to the simple connection mode (timed out). In a case of determining that the process has timed out, the CPU 302 performs the processing of S712. The CPU 302 can display a message indicating that the process has timed out on the display unit 311 at this time. In a case of determining that the process has not timed out, the CPU 302 performs the processing of S702 again.

In S704, the CPU 302 determines whether authentication for establishing a wireless LAN connection has been successful. Specifically, the CPU 302 determines whether the received wireless LAN connection request includes an SSID or password for simple connection mode, device information corresponding to the printer 300 or camera 200, and so forth. If such information is included, a determination is made that authentication has been successful. In a case of determining that that authentication for establishing a wireless LAN connection has been successful, the CPU 302 performs the processing of S705. The CPU 302 can notify the camera 200 or display on the display unit 311 that authentication has been successful at this time. In a case of determining that that authentication for establishing a wireless LAN connection has not been successful, the CPU 302 performs the processing of S712. The CPU 302 can notify the camera 200 or display on the display unit 311 that authentication has not been successful at this time.

In S705, the CPU 302 establishes a wireless LAN connection between the camera 200 and the printer 300. In S706, the CPU 302 determines whether a print job has been received from the camera 200 via the wireless LAN connection. In a case of determining that a print job has been received, the CPU 302 performs the processing of S708. In a case of determining that a print job has not been received, the CPU 302 performs the processing in S707 to determine whether a predetermined amount of time has elapsed after having established the wireless LAN connection (timed out). In a case of determining that the process has timed out, the CPU 302 performs the processing of S712. The CPU 302 can display a message indicating that the process has timed out on the display unit 311 at this time. In a case of determining that the process has not timed out, the CPU 302 performs the processing of S706 again.

In S708, the CPU 302 executes print processing based on the received print job. In S709, the CPU 302 determines whether the user has performed a cancel operation of the received print job. The user can cancel the print job either by performing an operation at the camera 200 or an operation at the printer 300 (pressing the cancel button 431 or cancel button 441 or the like). In a case where execution of a print job is cancelled by an operation at the camera 200, the CPU 302 communicates with the camera 200 via the wireless LAN connection, and receives information that the print job has been cancelled. In a case where execution of a print job is cancelled by an operation at the printer 300, the CPU 302 communicates with the camera 200 via the wireless LAN connection, and transmits information that the print job has been cancelled. In a case of determining that an operation cancelling the job has been performed, the CPU 302 performs the processing of S712. In a case of determining that an operation cancelling the job has not been performed, the CPU 302 performs the processing of S710.

In S710, the CPU 302 determines whether processing of the received print job has been completed. In a case where determination is made that processing of the received print job has been completed, the CPU 302 performs the processing of S711. In a case where determination is made that processing of the received print job has not been completed, the CPU 302 performs the processing of S709 again.

In S711, the CPU 302 notifies the camera 200 via the wireless LAN connection that the processing of the received print job has been completed. In S712, the CPU 302 cuts off the wireless LAN connection, and returns the printer 300 to the connection mode immediately before the simple connection mode, using information saved immediately before transitioning to the simple connection mode. The CPU 302 then ends the processing.

Figure 8:
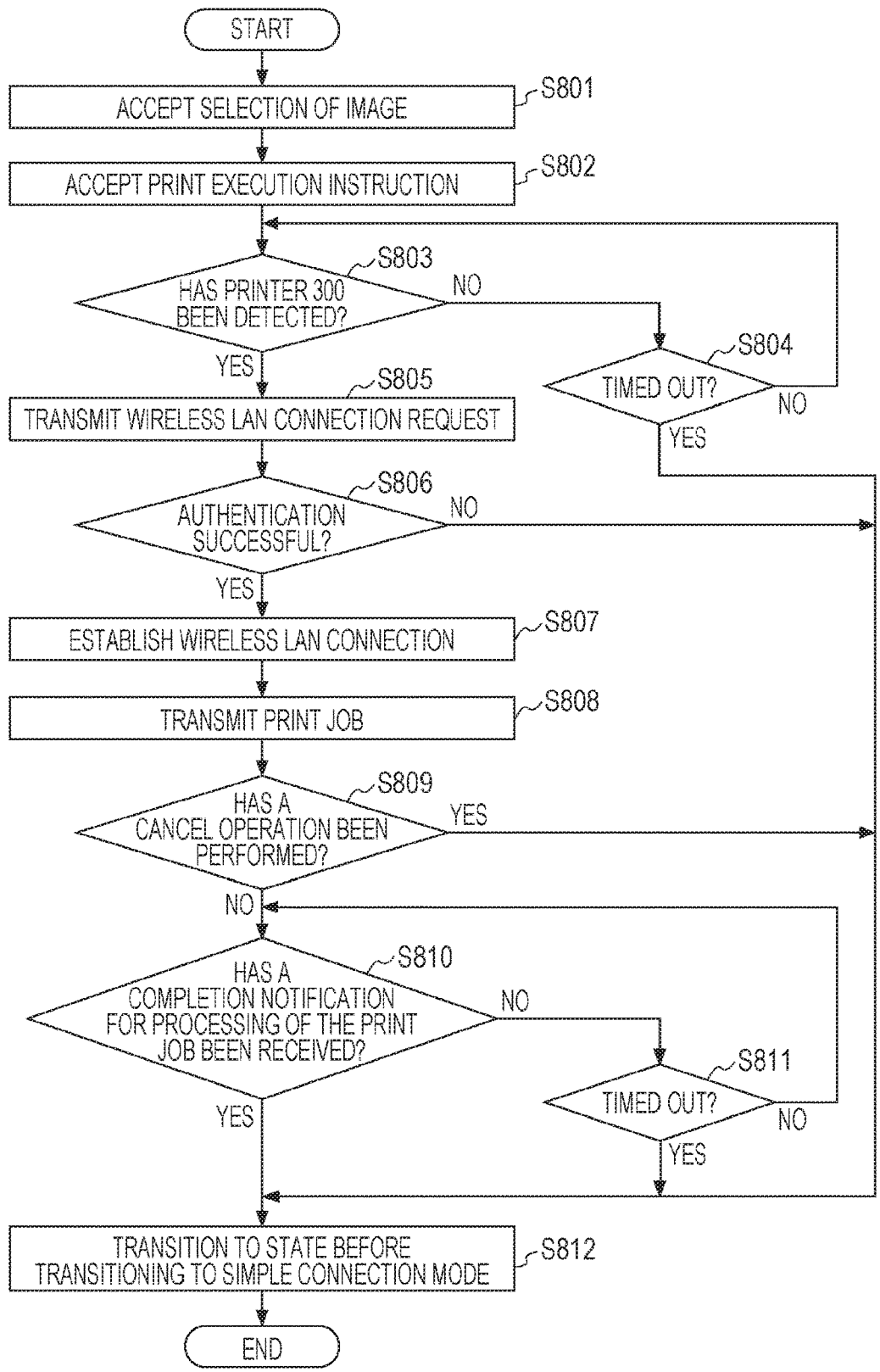
FIG. 8 is a flowchart illustrating processing executed by a terminal device according to the first embodiment.
Figure 9:
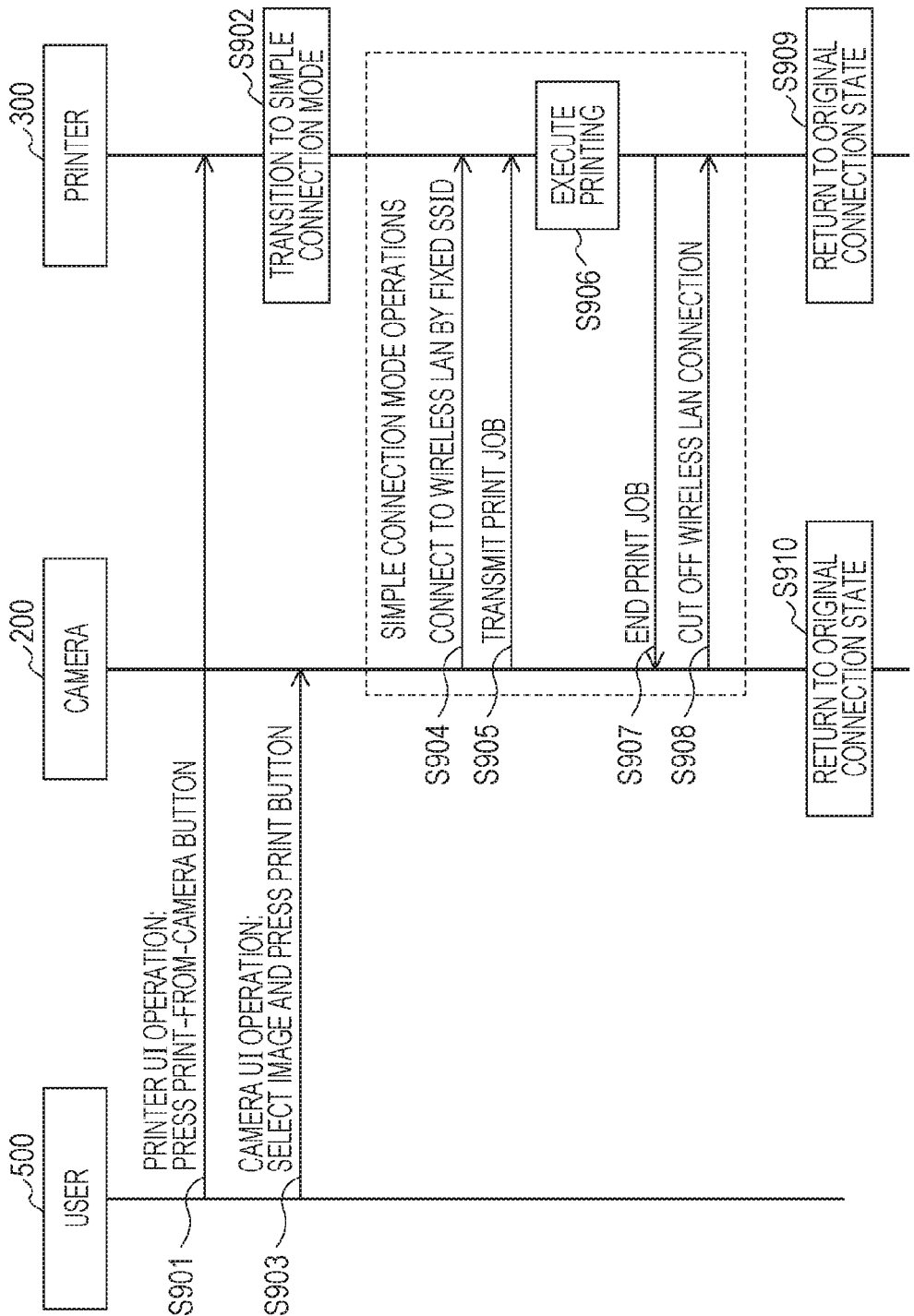
FIG. 9 is a sequence diagram illustrating a case of simple connection being executed between the communication device and terminal device according to the first embodiment.

FIG. 8 is a flowchart illustrating processing that the camera 200 executes in a case where the printer 300 and camera 200 are connected by simple connection. The processing illustrated in this flowchart is realized by the CPU 202 reading out various types of programs stored in memory such as the ROM 203 to the RAM 204 and executing the programs. The processing in this flowchart is started in a state where the image selection screen for selecting image data for the printer 300 to print is displayed on the display unit 209.

First, in S801, the CPU 202 detects that a selection by the user of image data to be printed by the printer 300 has been accepted. Upon accepting selection of an image, the CPU 202 displays an image display screen 520 corresponding to the selected image on the display unit 209.

In S802, the CPU 202 is instructed by the user to execute printing of the selected image. That is, the CPU 202 accepts a communication instruction from the user of image data corresponding to the selected image. Specifically, the CPU 202 detects that the user has pressed the print execution button 522. The CPU 202 then enables the wireless LAN function of the camera 200, and starts searching for a beacon emitted from the printer 300.

In S803, the CPU 202 determines whether the printer 300 has been detected. Specifically, the CPU 202 compares connection information for simple connection mode previously held with the detected beacon, and determines whether a beacon including information, such as the SSID for simple connection mode and so forth, has been detected.

In a case of determining detection of the printer 300, the CPU 202 performs the processing of S805. In a case of determining that the printer 300 has not been detected, the CPU 202 in S804 determines whether a predetermined amount of time has elapsed after detecting that the print execution button 522 has been pressed (timed out). In a case of determining that the process has timed out, the CPU 202 performs the processing of S812. The CPU 202 can display a message indicating the process has timed out on the display unit 209 at this time. In a case of determining that the process has not timed out, the CPU 202 performs the processing of S803 again.

In S805, the CPU 202 transmits a wireless LAN connection request to the detected printer 300. The wireless LAN connection request includes an SSID and password for simple connection mode, device information of the camera 200 (MAC address, device type, etc.) and so forth.

In S806, the CPU 202 determines whether authentication by the printer 300 to establish a wireless LAN connection has been successful. Specifically, the CPU 202 determines whether a notification has been received from the printer 300 indicating that authentication has been successful. In a case of determining that authentication for establishing a wireless LAN connection has been successful, the CPU 202 performs the processing of S807. The CPU 202 stores the connection mode of the camera 200 and connection partner information immediately before establishing the simple connection in the non-volatile memory 205 or the like. In a case of determining that authentication for establishing a wireless LAN connection has not been successful, the CPU 202 displays a message on the display unit 209 indicating that authentication was not successful, and performs the processing of S812.

In S807, the CPU 202 establishes a wireless LAN connection between the printer 300 and the camera 200. In S808, the CPU 202 transmits a print job to print the selected image to the printer 300 via the wireless LAN connection.

In S809, the CPU 202 determines whether the user has performed a cancel operation of the received print job. Specifically, the CPU 202 determines whether information indicating that the print job has been cancelled has been received from the printer 300. The CPU 202 also determines whether a cancel button displayed on the display unit 209 has been pressed after transmission of the print job has been completed.

In a case of determining that an operation cancelling the job has been performed by the user, the CPU 202 displays a message on the display unit 209 indicating that the processing of the print job has been cancelled, and performs the processing of S812. In a case of determining that the user has not performed a cancel operation, the CPU 202 performs the processing of S810.

In S810, the CPU 202 determines whether a notification indicating that processing of the print job has been completed has been received from the printer 300. In a case of determining that a notification indicating that processing of the print job has been completed has been received from the printer 300, the CPU 202 performs the processing of S812. In a case of determining that a notification indicating that processing of the print job has been completed has not been received from the printer 300, the CPU 202 in S811 determines whether a predetermined amount of time has elapsed after having transmitted the print job (timed out).

In a case of determining that the process has timed out, the CPU 202 performs the processing of S812. The CPU 202 can display a message indicating that the process has timed out on the display unit 209 at this time. In a case of determining that the process has not timed out, the CPU 202 performs the processing of S810 again.

In S812, the CPU 202 cuts off the wireless LAN connection, and returns the camera 200 to the connection mode immediately before establishing the wireless LAN connection using the information saved immediately before establishing the wireless LAN connection. The CPU 202 then ends the processing.

As described above, the camera 200 connects to the printer 300 operating in simple connection mode in the present embodiment using fixed connection information for simple connection mode. The fixed connection information for simple connection mode is pre-stored, at the time of shipping from the manufacturer, in the camera's 200 memory so the camera 200 does not request the user for input of connection information when connecting. This arrangement, according to the present embodiment, enables the camera 200 and printer 300 to connect without the user having to perform troublesome wireless LAN settings. The present embodiment is also advantageous compared to conventional connection methods that omit troublesome wireless LAN settings by the user, such as Wi-Fi Protected Setup™ (WPS), since there is no need for processing to acquire connection information from the communication device such as pushbutton authentication processing or the like, so the connection can be quickly started.

Also, in the present embodiment, in a case of accepting a communication instruction for data from the user, the camera 200 establishes a connection using fixed connection information, and transmits data via this connection. Thus, in the present embodiment, both establishing of a connection and transmission of data are automatically performed based on accepting a communication instruction for data from the user. Thus, the user does not have to separately perform operations to establish a connection and operations to transmit data. Accordingly, the present embodiment improves user convenience in establishing connections and transmitting data.

In the present embodiment, simple connection is executable only in a case where the user directly operates the printer 300 and the printer 300 transitions to the simple connection mode, as in S901 above. Also, in a case where printing ends or the connection has been cut off, the printer 300 releases the simple connection mode, and simple connection becomes non-executable. According to this arrangement, a situation where a state of simple connection being executable is maintained for an extended period of time can be suppressed. That is, restricting the amount of time over which simple connection is executable to an optional period for a user who can operate the printer 300 results in suppressing a terminal device that a third party has from performing simple connection with the printer 300.

Second Embodiment

Figure 10:
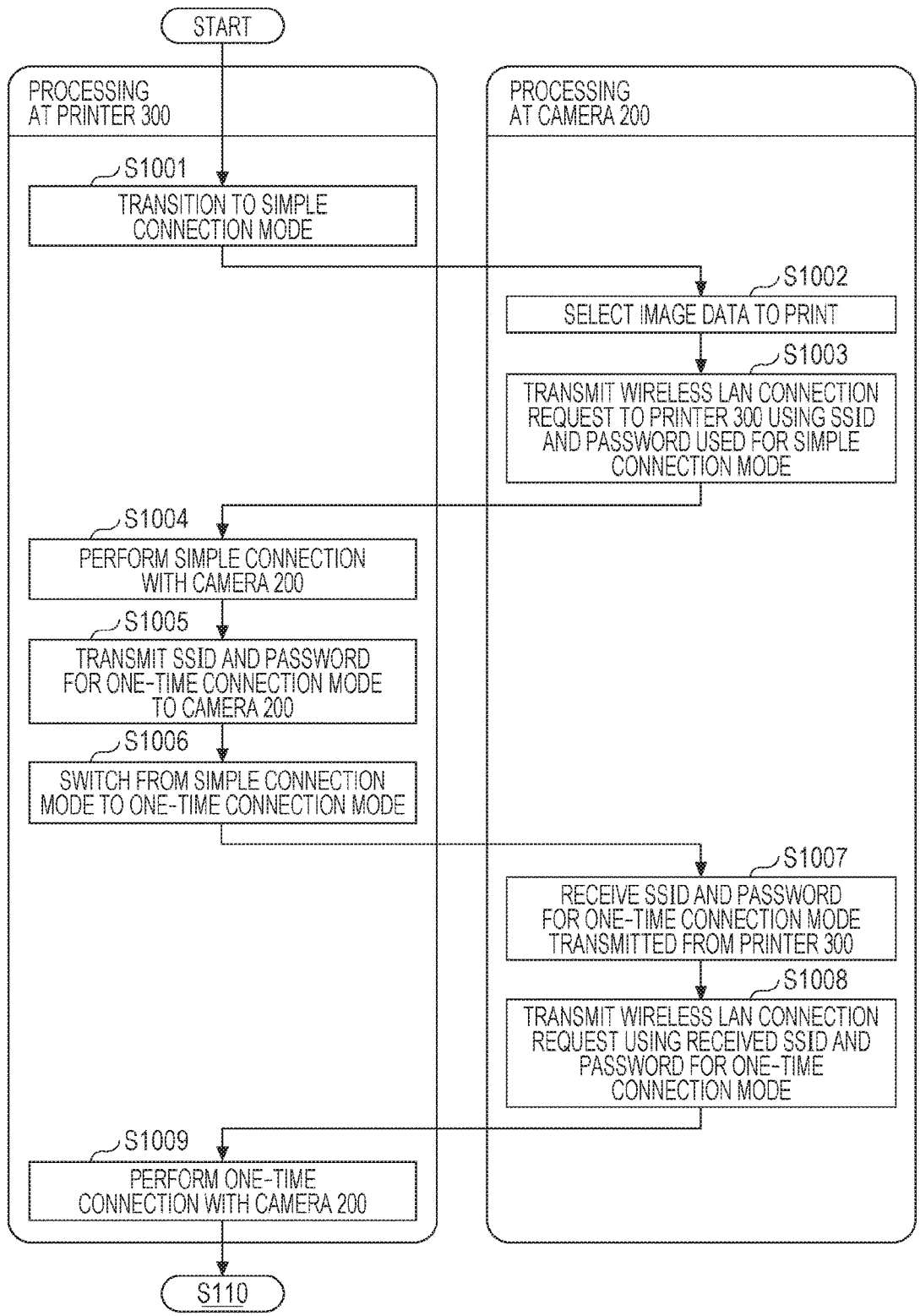
FIG. 10 is a diagram illustrating processing executed by the terminal device and communication device according to a second embodiment.

Processing executed by the printer 300 and the camera 200 in the present embodiment will be described with reference to FIGS. 10 and 11. FIG. 10 illustrates processing performed in a case where the printer 300 and camera 200 connect in a one-time connection mode. The processes executed by the devices in this sequence diagram are realized by CPUs provided to the devices reading out various types of programs, stored in memory such as ROM provided to the devices, to RAM provided to the devices, and executing the programs. This processing is started in a case where the CPU 302 detects that the print-from-camera button 423 has been pressed.

In S1001, the CPU 302 transitions the printer 300 to the simple connection mode. As a specific example of S1001, the CPU 302 activates an access point within the printer 300 that is connectable by the above-described fixed connection information.

Upon starting operations as an access point with an SSID for simple connection mode, the printer 300 starts emitting a beacon including connection information, such as the SSID for simple connection mode, and so forth. Accordingly, the camera 200 can receive the beacon and recognize that a printer 300 in is present nearby. Before transitioning to the simple connection mode, the printer 300 performs storage control processing to store information of the connection mode of the printer 300 at that time in the non-volatile memory 305 or the like. Information of the connection mode is information relating to the connection status of the printer 300 at that time. Examples include device information of the connection partner, connection information for reconnecting to the connection partner, connection mode name, and so forth. Examples of connection modes include a wired LAN connection mode where communication is performed over a wired LAN, an infrastructure connection mode where communication is performed with a terminal device via an access point external to the printer 300, a direct connection mode where P2P communication is performed with a device external to the printer 300, and so forth.

In a case where there is no wireless LAN connection request from the camera 200 for a predetermined amount of time, the printer 300 that transitioned to the simple connection mode transitions to the connection mode before transitioning to the simple connection mode, and ends processing. At this time, the printer 300 transitions to the connection mode before transitioning to the simple connection mode using the information of the connection partner saved immediately before transitioning to the simple connection mode.

An arrangement can be made where no jobs are accepted in a case where the printer 300 is operating in the simple connection mode. The arrangement can be such that the printer 300 accepts jobs except for jobs received using connection information for simple connection mode, or can be such that no jobs, including those received via other connections (wired connections, connections through other communication methods, etc.) are accepted at all.

In S1002, the CPU 202 detects that the user has pressed the print execution button 522 (that a communication instruction for image data has been accepted). Image data to be printed by the printer 300 is selected by the user before the print execution button 522 is pressed. Thus, a communication instruction for image data serves as a trigger to transmit the print job.

In S1003, the CPU 202 detects the printer 300, and transmits a wireless LAN connection request to the printer 300 using the fixed SSID and password previously stored. The printer 300 is operating as an access point at this time, and accordingly is emitting a beacon including connection information such as the SSID. The CPU 202 recognizes the printer 300 in a case where the SSID included in the beacon received by the camera 200 matches the fixed SSID previously stored. The wireless LAN connection request includes an SSID and password for simple connection mode, device information of the camera 200 (MAC address, device type, etc.) and so forth.

In S1004, the CPU 302 performs authentication to establish a wireless LAN connection, using the SSID and password for simple connection mode transmitted from the camera 200 in S1003, and determines whether authentication has succeeded. In a case where authentication is successful, the CPU 302 establishes a wireless LAN connection between the camera 200 and the printer 300, and performs simple connection (wireless LAN connection by an SSID and password for simple connection mode). The communication path between the camera 200 and printer 300 can be encrypted by a format such as Secure Sockets Layer (SSL) or the like. In a case where authentication fails, the CPU 302 does not establish a wireless LAN connection between the camera 200 and the printer 300. The CPU 302 can transmit information notifying the camera 200 that authentication has failed at this time.

In S1005, the CPU 302 transmits connection information for one-time connection mode (SSID and password) to the camera 200 by wireless LAN communication. This one-time connection mode is a mode where the printer 300 operates as a connectable access point using dynamically generated connection information (SSID, password, etc.). The connection information generated for one-time connection mode is generated by a method such as, for example, time synchronization where the information is random and is different from information previously generated (or at least the previous time). That is, the printer 300 transmits connection information for one-time connection mode, which differs in content from the connection information for one-time connection mode that was transmitted at least the previous time. The camera 200 acquires the connection information for one-time connection mode that differs from the connection information for one-time connection mode acquired at least the previous time. This means that one set of connection information for one-time connection mode is used only once.

The timing of generating connection information for one-time connection mode is not restricted. That is, the connection information for one-time connection mode can be generated immediately before being transmitted in S1005, or can be generated after transmission and saved in memory until the next time. Methods for generating one-time connection information are not restricted to the above arrangement, and any method that provides for one-time connection information is applicable.

In S1006, the CPU 302 transitions the connection mode of the printer 300 from the simple connection mode to the one-time connection mode. Upon transitioning to the one-time connection mode, the printer 300 operates as an access point accessible using the SSID and password transmitted in S1005. That is, as one specific example of processing in S1006, the CPU 302 activates an access point within the printer 300 using the SSID and password transmitted in S1005.

In S1007, the CPU 202 acquires a beacon transmitted from the printer 300 operating in the one-time connection mode, and detects the SSID and password for one-time connection mode. In S1008, the CPU 202 cuts off the simple connection between the camera 200 and the printer 300. The CPU 202 then transmits a wireless LAN connection request to the printer 300, using the SSID and password for one-time connection mode detected in S1007. The wireless LAN connection request includes an SSID and password for one-time connection mode, device information of the camera 200, and so forth.

In S1009, the CPU 302 performs authentication using the SSID and password for one-time connection mode included in the wireless LAN connection request transmitted from the camera 200 in S1008, and determines whether authentication has been successful. In a case where authentication has been successful, the CPU 302 establishes a wireless LAN connection between the camera 200 and the printer 300, and performs one-time connection (a wireless LAN connection by SSID and password for one-time connection mode). The communication path between the camera 200 and printer 300 can be encrypted by a format such as SSL or the like. In a case where there is no wireless LAN connection request from the camera 200 for a predetermined amount of time, the CPU 302 transitions the printer 300 to the connection mode before transitioning to the simple connection mode, using information stored immediately before transitioning to the simple connection mode.

Figure 11:
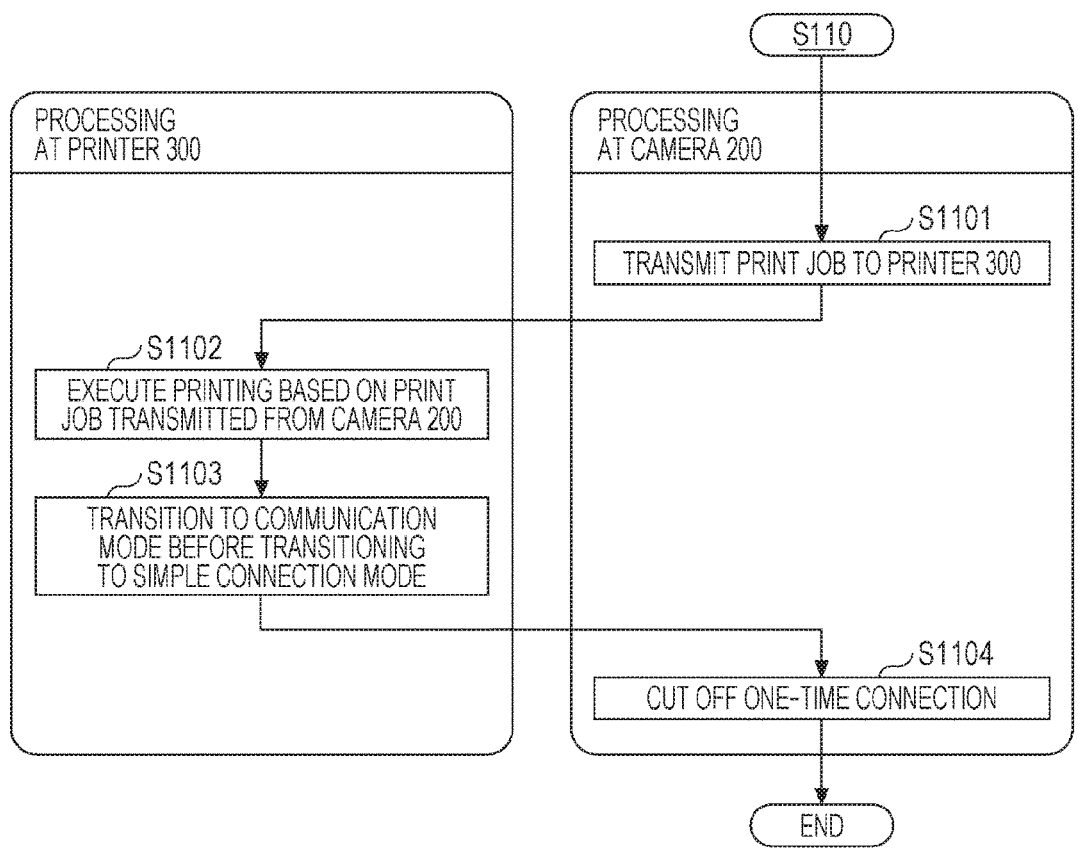
FIG. 11 is a diagram illustrating processing executed by the terminal device and communication device according to the second embodiment.

FIG. 11 illustrates processing at the time the camera 200 transmits a print job to the printer 300, the printer 300 executing the printing, the communication mode transitioning to the communication mode before transitioning to the simple connection mode. This processing is realized by CPUs provided to the devices reading out various types of programs, stored in memory provided to the devices, to RAM provided to the devices, and executing the programs. This processing is started in a case where processing of S1009 ends in S1009.

In S1101, the CPU 202 transmits a print job including image data that the user has selected in S1002, to the printer 300. In S1102, the CPU 302 executes printing based on the print job transmitted from the camera 200 in S1101. In S1103, after completion of the printing executed in S1102, the CPU 302 uses the information stored immediately before transitioning to the simple connection mode to transition the printer 300 to the communication mode before transitioning to the simple connection mode.

In S1104, the CPU 202 cuts off the one-time connection between the camera 200 and printer 300. The CPU 202 can cut off the one-time connection without waiting for the printer 300 complete printing. The printer 300 can cut off the one-time connection from that side. After cutting off the one-time connection, the CPU 202 and CPU 302 can turn the wireless LAN function off, or return to the connection state before the simple connection.

Figure 14A:
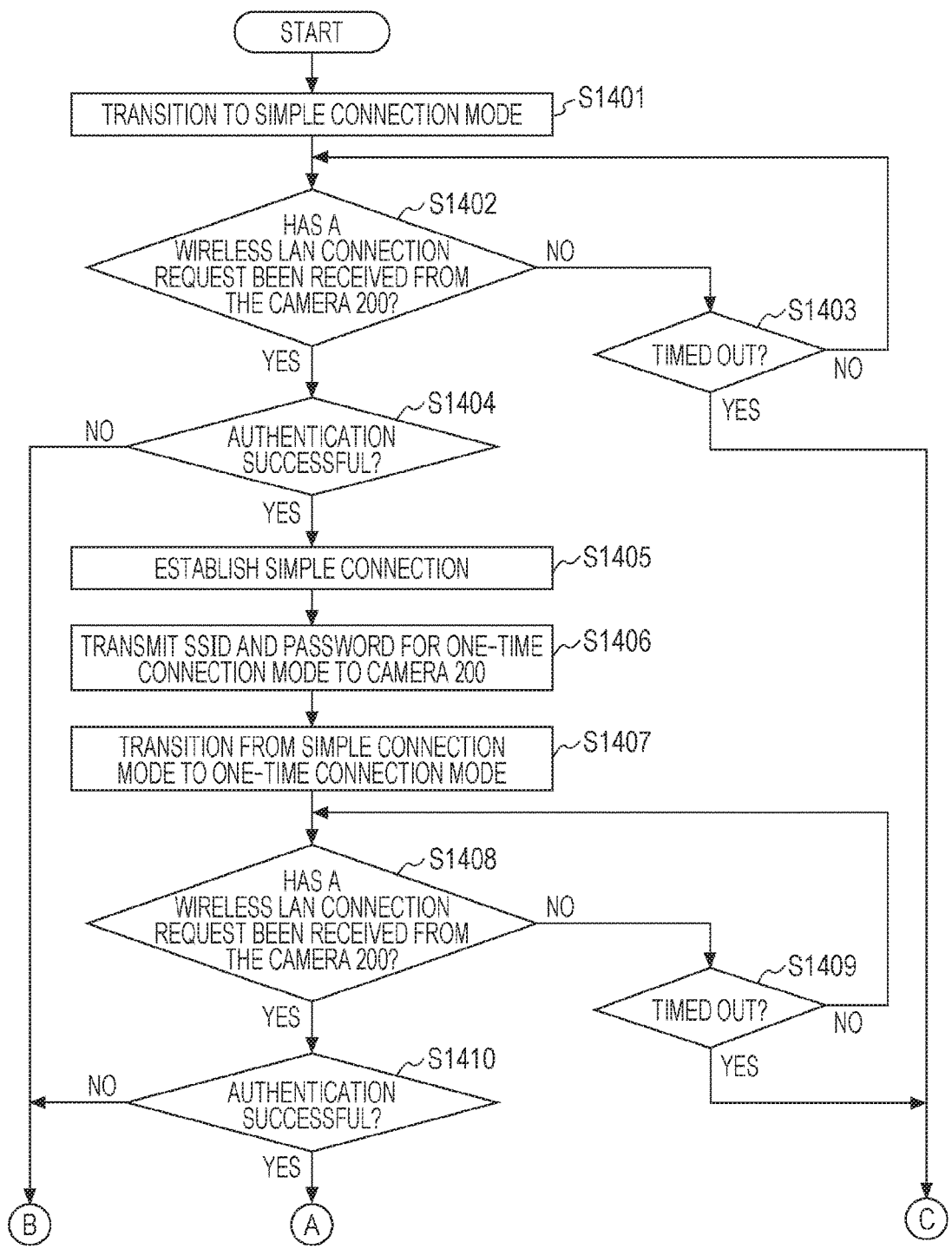
FIGS. 14A and 14B are a flowchart illustrating processing executed by the communication device according to the second embodiment.
Figure 14B:
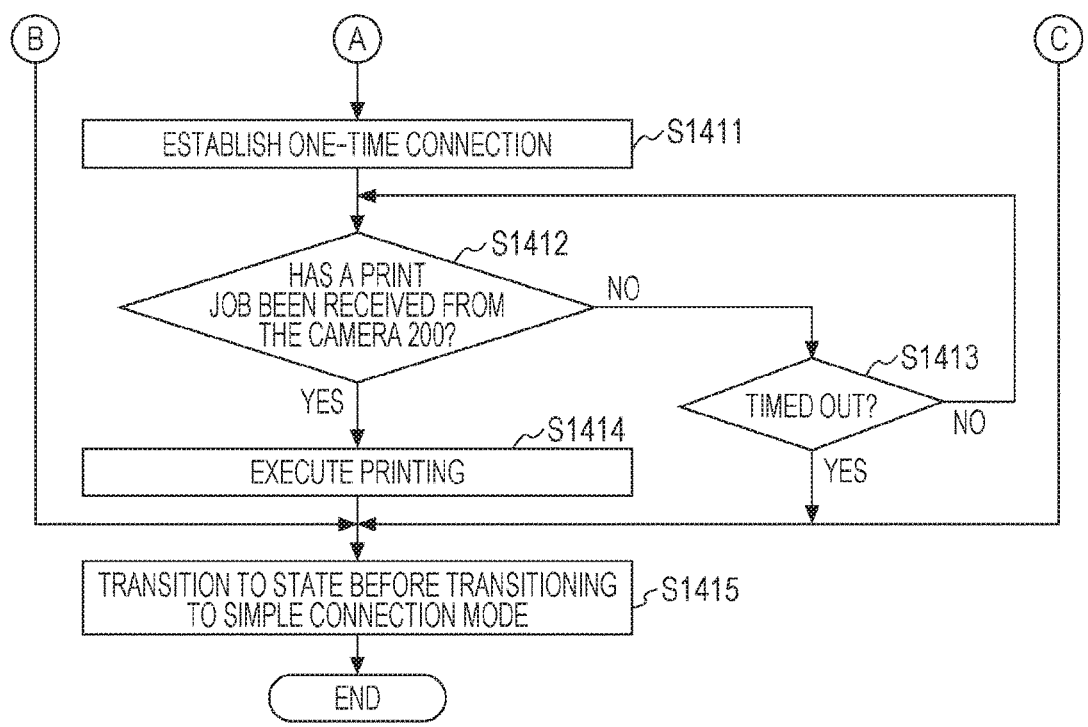

FIGS. 14A and 14B are a flowchart illustrating the flow of processing that the printer 300 executes according to the present embodiment. The processing illustrated in this flowchart is realized, for example, by the CPU 302 reading out various types of programs stored in memory such as the ROM 303 to the RAM 304 and executing the programs. The processing in FIGS. 14A and 14B is started in a case where the CPU 302 detects that user has pressed the print-from-camera button 423.

In S1401, the CPU 302 transitions the printer 300 to the simple connection mode. The CPU 302 causes the printer 300 to operate as an access point with an SSID for simple connection mode. Upon starting operations as an access point with an SSID for simple connection mode, the printer 300 starts emitting a beacon including connection information, such as SSID and so forth for simple connection mode. Before transitioning the printer 300 to the simple connection mode, the CPU 302 also stores the connection mode of the printer 300 and information of the connection partner at that time in the non-volatile memory 305 or the like.

In S1402, the CPU 302 determines whether a wireless LAN connection request has been received from the camera 200. In a case of determining that a wireless LAN connection request has been received, the CPU 302 performs the processing of S1404. In a case of determining that a wireless LAN connection request has not been received, the CPU 302 determines in S1403 whether a predetermined amount of time has elapsed from the printer 300 transitioning to the simple connection mode (timed out). In a case of determining that the process has timed out, the CPU 302 returns the printer 300 to the connection mode immediately prior to the simple connection mode and ends the process. The CPU 302 can display a message indicating that the process has timed out on the display unit 311 at this time. In a case of determining that the process has not timed out, the CPU 302 performs the processing of S1402 again.

In S1404, the CPU 302 determines whether authentication for establishing a wireless LAN connection has been successful. Specifically, the CPU 302 determines whether the received wireless LAN connection request includes an SSID or password for simple connection mode, device information corresponding to the printer 300 or camera 200, and so forth. In a case of determining that that authentication for establishing a wireless LAN connection has been successful, the CPU 302 performs the processing of S1405. The CPU 302 can notify the camera 200 that authentication has been successful at this time. In a case of determining that that authentication for establishing a wireless LAN connection has not been successful, the CPU 302 returns the printer 300 to the connection mode immediately prior to the simple connection mode and ends the processing. The CPU 302 can display on the display unit 311 or notify the camera 200 that authentication has not been successful.

In S1405, the CPU 302 establishes a wireless LAN connection between the camera 200 and the printer 300. In S1406, the CPU 302 generates an SSID and password for one-time connection mode, and transmits the SSID and password for one-time connection mode to the camera 200 by the connection established in S1405. The CPU 302 does not have to generate the SSID and password for one-time connection mode in S1406, and an arrangement can be made, for example, where an SSID and password to be used for one-time connection mode the next time is generated at the time of releasing the one-time connection mode.

The CPU 302 can also determine in S1406 whether the terminal device to which the connection information is being sent is the terminal device corresponding to the connection request first received after having transitioned to the simple connection mode in S1401. An arrangement can be made where the connection information is only sent to the terminal device corresponding to the connection request first received.

In S1407, the CPU 302 transitions the printer 300 from the simple connection mode to the one-time connection mode. Specifically, the CPU 302 causes the printer 300 to operate as an access point using the SSID for one-time connection mode transmitted in S1406. Upon starting operations as an access point using the SSID for one-time connection mode, the printer 300 starts to transmit a beacon including connection information such as the SSID for one-time connection mode.

In S1408, the CPU 302 determines whether a wireless LAN connection request has been received from the camera 200. In a case of determining that a wireless LAN connection request has been received, the CPU 302 performs the processing of S1410. In a case of determining that a wireless LAN connection request has not been received, the CPU 302 determines in S1409 whether a predetermined amount of time has elapsed from the printer 300 transitioning to the one-time connection mode (timed out). In a case of determining that the process has timed out, the CPU 302 returns the printer 300 to the connection mode immediately prior to the simple connection mode and ends the processing. The CPU 302 can display a message indicating that the process has timed out on the display unit 311 at this time. In a case of determining that the process has not timed out, the CPU 302 performs the processing of S1408 again.

In S1410, the CPU 302 determines whether authentication for establishing a wireless LAN connection has been successful. Specifically, the CPU 302 determines whether the received wireless LAN connection request includes an SSID or password for one-time connection mode, device information corresponding to the printer 300, and so forth. In a case of determining that that authentication for establishing a wireless LAN connection has been successful, the CPU 302 performs the processing of S1411. In a case of determining that that authentication for establishing a wireless LAN connection has not been successful, the CPU 302 returns the printer 300 to the connection mode immediately prior to the simple connection mode and ends the processing. The CPU 302 can display on the display unit 311 that authentication has not been successful.

In S1411, the CPU 302 establishes a one-time connection with the camera 200 by wireless LAN. In S1412, the CPU 302 determines whether a print job has been received from the camera 200. In a case of determining that a print job has been received, the CPU 302 performs the processing of S1414. In a case of determining that a print job has not been received, the CPU 302 determines in S1413 whether a predetermined amount of time has elapsed after having transitioned the printer 300 to the one-time connection mode (timed out). In a case of determining that the process has timed out, the CPU 302 returns the printer 300 to the connection mode immediately prior to the simple connection mode and ends the processing. The CPU 302 can display a message indicating that the process has timed out on the display unit 311 at this time. In a case of determining that the process has not timed out, the CPU 302 performs the processing of S1412 again.

In S1414, the CPU 302 executes print processing based on the received print job. In S1415, the CPU 302 cuts off the one-time connection with the camera 200, returns the printer 300 to the connection mode immediately prior to the simple connection mode, and ends the processing. The timing of cutting off the one-time connection with the camera 200 is not restricted, and can be any timing as long as it is after completion of receipt of the print job. For example, immediately after receipt of the print job has completed, when processing of the print job has completed, or the like.

Figure 15:
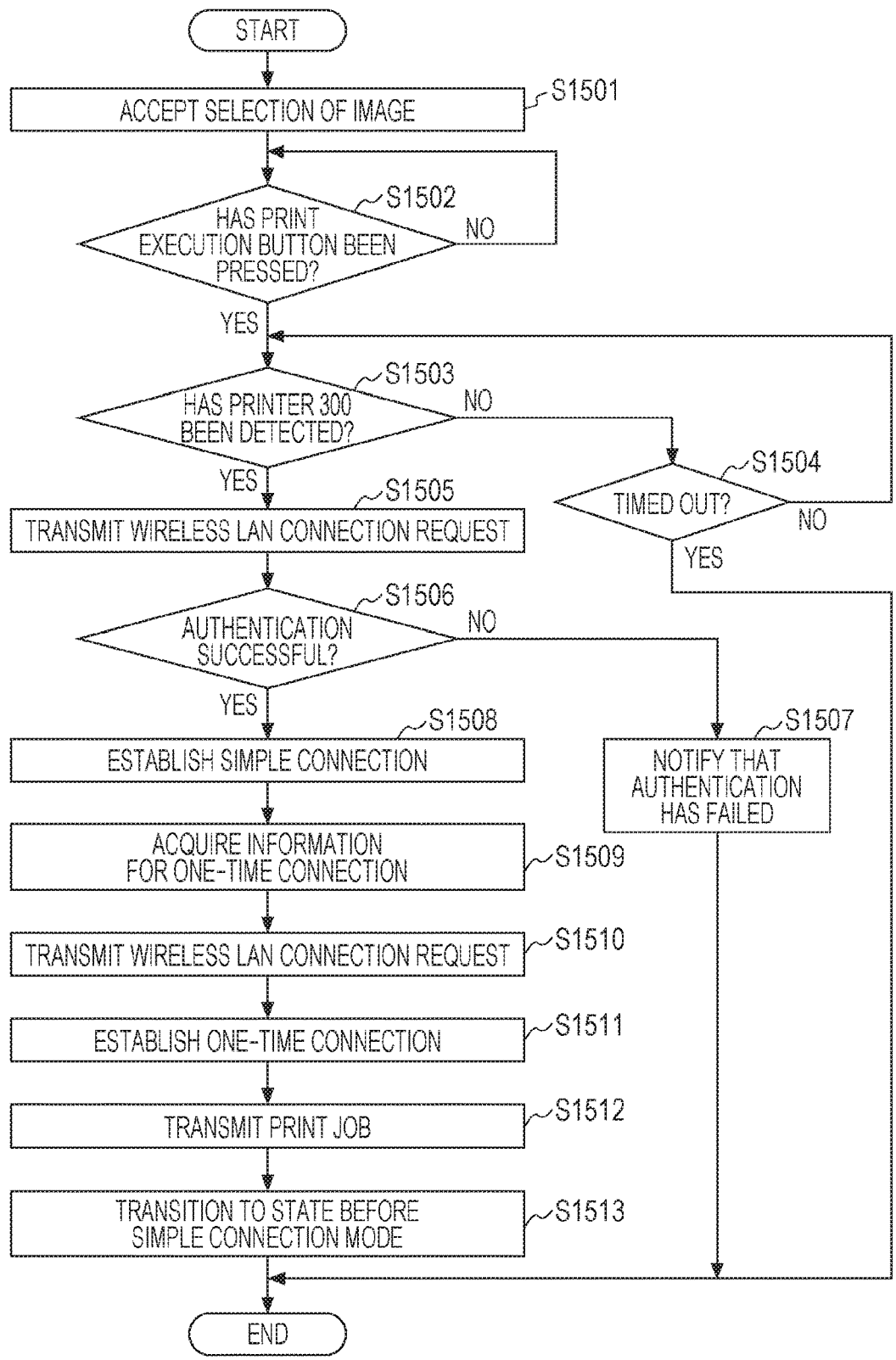
FIG. 15 is a flowchart illustrating processing executed by the terminal device according to the second embodiment.

FIG. 15 is a flowchart illustrating processing that the camera 200 executes in the present embodiment. The processing illustrated in this flowchart is realized by the CPU 202 reading out various types of programs stored in memory such as the ROM 203 to the RAM 204 and executing the programs. The processing in the flowchart in FIG. 15 is started in a state where the image selection screen for selecting image data for the printer 300 to print is displayed on the display unit 209.

First, in S1501, the CPU 202 detects acceptance of a selection of image data to be printed by the printer 300 from the user. Upon accepting selection of an image, the CPU 202 displays an image display screen 520 corresponding to the selected image on the display unit 209.

In S1502, the CPU 202 determines whether the user has pressed the print execution button 522. In a case of determining that the user pressed the print execution button 522, the CPU 202 enables the wireless LAN function of the camera 200, and starts searching for a beacon emitted from the printer 300. Otherwise, the CPU 202 repeats S1502.

In S1503, the CPU 202 determines whether the printer 300 has been detected. Specifically, the CPU 202 determines whether a beacon including information such as the SSID for simple connection mode and so forth, previously stored in the camera's 200 memory has been detected. In a case of determining that the printer 300 has been detected, the CPU 202 performs the processing of S1505. In a case of determining that the printer 300 has not been detected, the CPU 202 in S1504 determines whether a predetermined amount of time has elapsed after detecting that the print execution button 522 has been pressed (timed out). In a case of determining that the process has timed out, the CPU 202 ends the process. The CPU 202 can display a message indicating that the process has timed out on the display unit 209 at this time. In a case of determining that the process has not timed out, the CPU 202 performs the processing of S1502 again.

In S1505, the CPU 202 transmits a wireless LAN connection request to the detected printer 300. The wireless LAN connection request includes an SSID and password for simple connection mode, device information of the camera 200 (MAC address, device type, etc.) and so forth.

In S1506, the CPU 202 determines whether authentication by the printer 300 to establish a wireless LAN connection has been successful. In a case of determining that authentication for establishing a wireless LAN connection has been successful, the CPU 202 performs the processing of S1508. The CPU 202 stores the connection mode of the camera 200 immediately before connection in S1508. In a case of determining that authentication for establishing a wireless LAN connection has not been successful, in S1507, the CPU 202 displays a message on the display unit 209 indicating that authentication was not successful, and then ends the process.

In S1508, the CPU 202 establishes a wireless LAN connection with the printer 300 via an access point for simple connection mode. In S1509, the CPU 202 acquires an SSID and password for one-time connection mode from the printer 300. In S1510, the CPU 202 detects the beacon that includes the SSID and password for one-time connection mode, and transmits a wireless LAN connection request to the printer 300.

In S1511, the CPU 202 establishes a one-time connection with the printer 300. In S1512, the CPU 202 transmits a print job, including the image data selected in S1501, to the printer 300 with which the one-time connection has been established.

In S1513, the CPU 202 cuts off the one-time connection with the printer 300, returns the connection state of the camera 200 to that immediately before establishing connection in S1508, and ends the process. The timing of cutting off the one-time connection with the printer 300 is not restricted, and can be any timing as long as it is after transmission of the print job has completed. For example, this can be immediately after transmission of the print job has completed, when the printer 300 provides notification that the processing of the print job has completed, or the like.

As described above, in the present embodiment, the printer 300 transitions to the simple connection mode and uses connection information for simple connection mode to establish a wireless LAN connection with the camera 200. The printer 300 then causes the camera 200 to newly acquire connection information for one-time connection mode via the connection established by the connection information for simple connection mode. Accordingly, the camera 200 can be made to, for example, newly acquire connection information for one-time connection mode (highly secure connection information that a third party cannot know) without user input of SSID or password. Accordingly, user operations for establishing a wireless LAN connection can be omitted in the present embodiment, thereby improving user operability.

The printer 300 transitions to the simple connection mode in accordance with user instructions, and releases the simple connection mode after exchanging connection information for the one-time connection mode. That is, by minimizing the amount of time operating in the simple connection mode, the amount of time where there is a possibility that another unintended terminal device (a terminal device of a third party) could be connected to the printer 300 can be minimized.

In a case of operating in the one-time connection mode, the printer 300 operates as an access point that can be connected to each time by randomly generated connection information. That is, only a terminal device connected to the printer 300 temporarily operating in simple connection mode can know the randomly-generated connection information. Accordingly, in a case where the printer 300 transitions to the one-time connection mode, connection with other unintended terminal devices can be suppressed.

Thus, the printer 300 and camera 200 perform connection using connection information for simple connection mode, and thereafter switch to a connection method with higher security in the present embodiment. Accordingly, a situation where the printer 300 connects with a terminal device of a third party can be suppressed, while improving user operability.

Also, in the present embodiment, in a case of accepting a communication instruction for data from the user, the camera 200 establishes an inter-device connection (a connection using connection information for simple connection mode and a connection using connection information for one-time connection mode), and transmits data via the connection. Accordingly, in the present embodiment, both establishing of a connection and transmission of data are based on accepting a communication instruction for data from the user, so the user does not need to perform operations for establishing a connection and operations for separately transmitting data. Accordingly, the present embodiment can improve user convenience in establishing connections and transmitting data.

Third Embodiment

The above-provided description in the second embodiment discussed an arrangement where, after simple connection, connection is made by connection information that is usable only once (one-time connection). A third embodiment provides an arrangement where, after simple connection, connection is made by connection information that is usable once or more. The schematic configurations of the devices in the present embodiment are the same as in the above embodiments, and description of configurations and processing the same as those described above are omitted.

Figure 12:
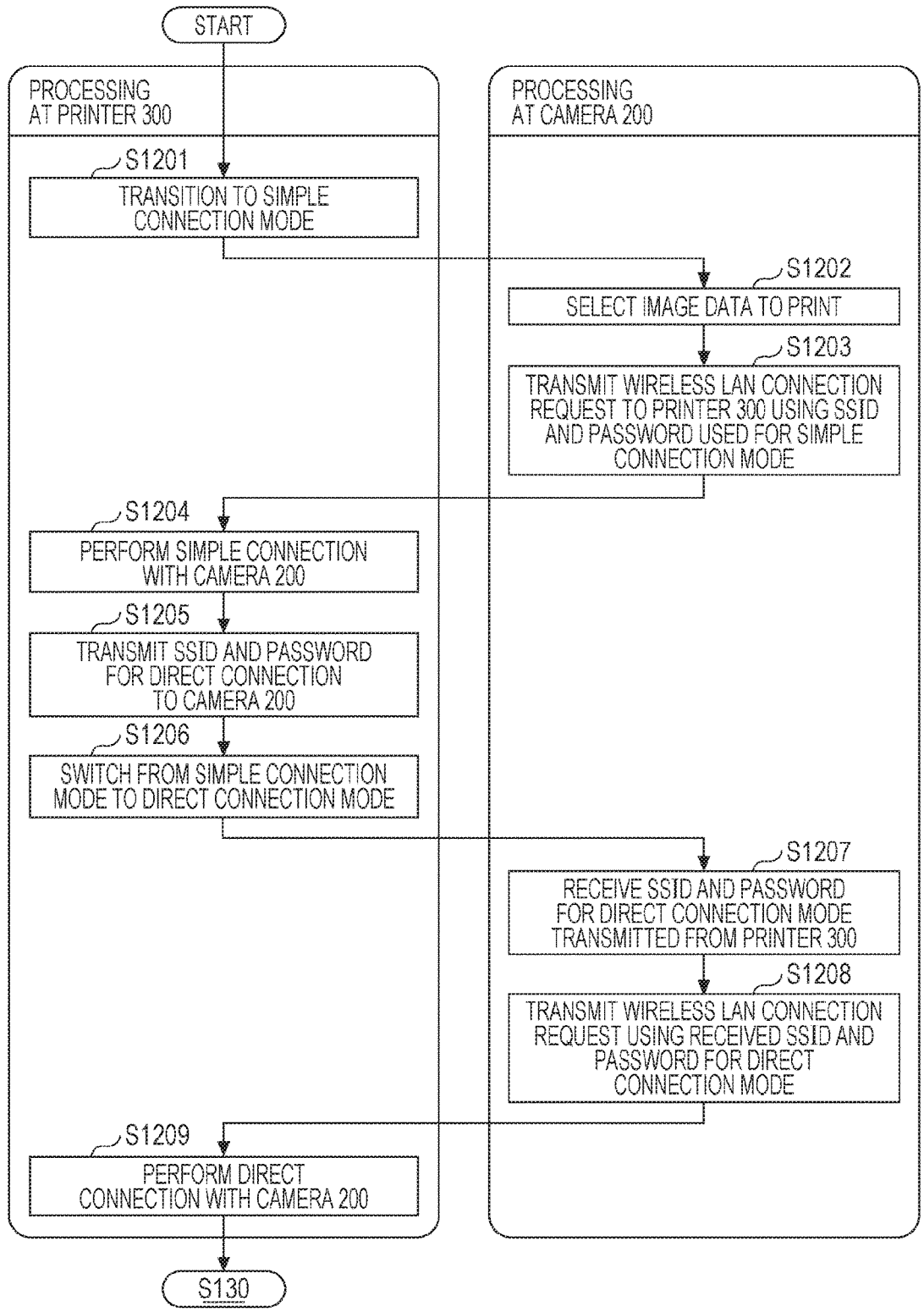
FIG. 12 is a diagram illustrating processing executed by the terminal device and communication device according to a third embodiment.

Processing according to the present embodiment will be described with reference to FIGS. 12 and 13. FIG. 12 illustrates processing performed in a case where the camera 200 and printer 300 connect in simple connection mode, exchange information for connection in a below-described direct connection mode, and connect in direct connection mode. Note that the processes executed by the devices in this sequence diagram are realized by CPUs provided to the devices reading out various types of programs, stored in memory such as ROM provided to the devices, to RAM provided to the devices, and executing the programs. The configurations of the devices in the present embodiment are equivalent to those in the first embodiment unless specifically stated otherwise, so description thereof is omitted.

The processing from S1201 through S1204 in FIG. 12 is the same as S1001 through S1004 in FIG. 10, so description is omitted.

In S1205, the CPU 302 transmits connection information for direct connection mode (SSID and password) to the camera 200. This direct connection mode is a mode where the printer 300 operates as an access point that can be connected to by connection information for direct connection mode. The connection information for direct connection mode is connection information settable by the user via the operating unit 309 or the like, and is saved in memory such as the non-volatile memory 305 or the like.

In S1206, the CPU 302 transitions the printer 300 from the simple connection mode to the direct connection mode. In S1207, the CPU 202 receives the SSID and password for direct connection mode transmitted from the printer 300. Unlike one-time connection information, the connection information for direct connection mode is not changed unless the user changes settings. Accordingly, the camera 200 can save the connection information for direct connection mode received in memory such as the non-volatile memory 205 or the like, and use it to reconnect to the printer 300.

In S1208, the CPU 202 cuts off the wireless LAN connection with the printer 300. The CPU 202 then transmits a wireless LAN connection request to the printer 300, using the SSID and password for direct connection mode received in S1207.

In S1209, the CPU 302 performs authentication using the SSID and password for direct connection mode included in the wireless LAN connection transmitted from the camera 200 in S1208, and determines whether authentication has been successful. In a case where authentication has been successful, the CPU 302 establishes a wireless LAN connection between the camera 200 and the printer 300, and performs direct connection (a wireless LAN connection by SSID and password for direct connection mode). The communication path between the camera 200 and printer 300 can be encrypted by a format such as SSL or the like. In a case where authentication fails, wireless LAN connection is not established between the camera 200 and the printer 300. The CPU 302 can transmit information to the camera 200 notifying that authentication has failed.

Figure 13:
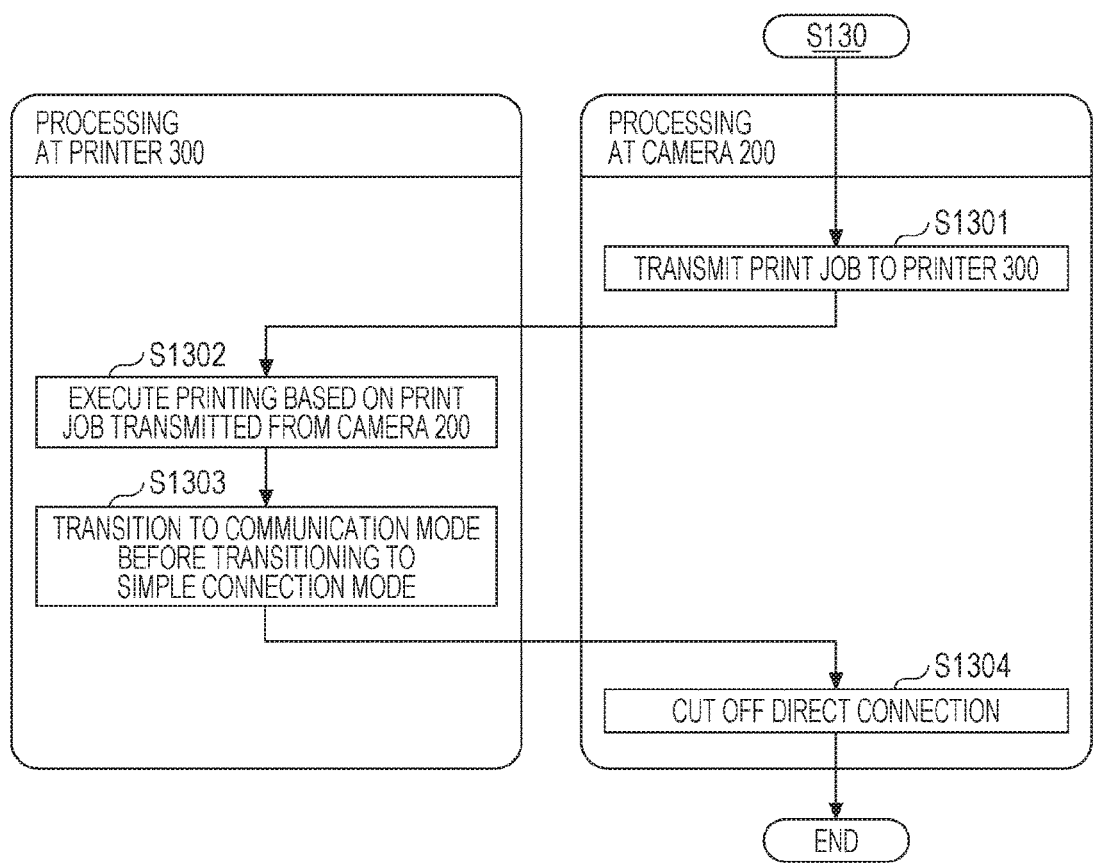
FIG. 13 is a diagram illustrating processing executed by the terminal device and communication device according to the third embodiment.

FIG. 13 illustrates processing wherein image data is transmitted from the camera 200 to the printer 300, printing is executed at the printer 300, and the communication mode is transitioned to the communication mode before transitioning to the simple connection mode. This processing is realized by CPUs provided to the devices reading out various types of programs, stored in memory provided to the devices, to RAM provided to the devices, and executing the programs.

The processing from S1301 through S1303 in FIG. 13 is the same as S1101 through S1103 in FIG. 11, so description is omitted.

In S1304, the CPU 202 cuts off the direct connection. The CPU 202 can cut off the direct connection without waiting for the printer 300 to complete the printing. The printer 300 can cut off the direct connection from that side. After cutting off the direct connection, the CPU 202 and CPU 302 can turn the wireless LAN function off, or return to the connection state before the simple connection.

Figure 16A:
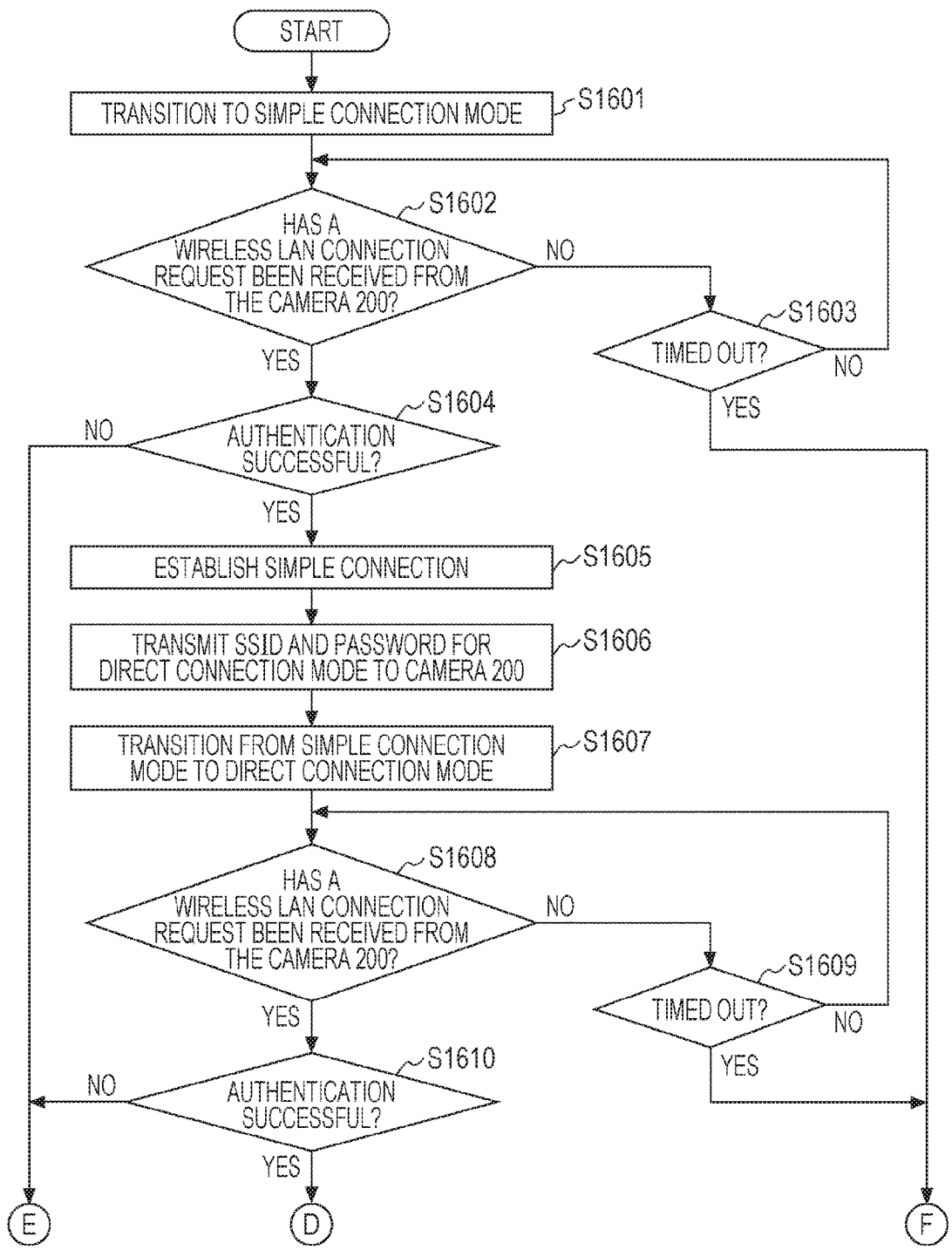
FIGS. 16A and 16B are a flowchart illustrating processing executed by the communication device according to a third embodiment.
Figure 16B:
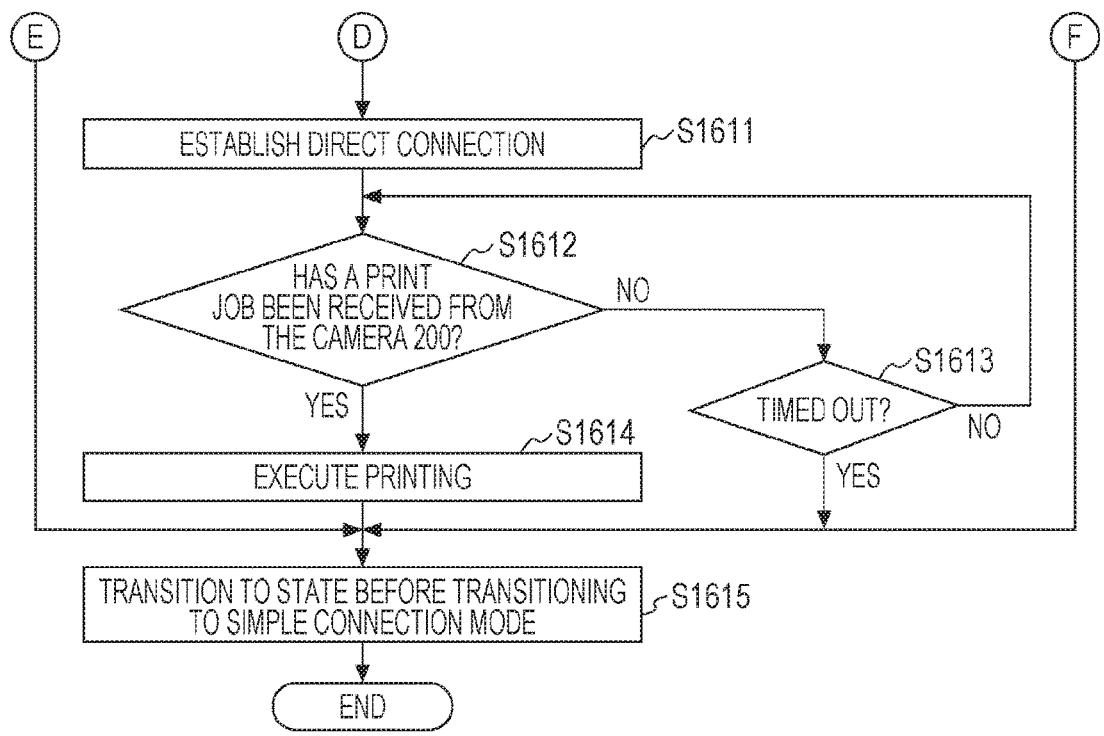

FIGS. 16A and 16B are a flowchart illustrating the flow of processing executed by the printer 300 according to the present embodiment. The processing illustrated in the flowchart in FIGS. 16A and 16B is realized by the CPU 302 reading out various types of programs stored in memory such as the ROM 303 to the RAM 304 and executing the programs, for example. The processing in FIGS. 16A and 16B is started in a case where the CPU 302 detects user selection of the print-from-camera button 423.

The processing from S1601 through S1605 is the same as S1401 through S1405, so description is omitted. In S1606, the CPU 302 acquires an SSID and password for direct connection mode from the non-volatile memory 305, and transmits the acquired SSID and password for direct connection mode to the camera 200 by the simple connection established in S1605.

In S1607, the CPU 302 transitions the printer 300 from the simple connection mode to the direct connection mode. Specifically, the CPU 302 causes the printer 300 to operate as an access point using the SSID for direct connection mode transmitted in S1606. Upon starting operations as an access point using the SSID for one-time connection mode, the printer 300 starts to transmit a beacon including connection information such as the SSID for direct connection mode.

In S1608, the CPU 302 determines whether a wireless LAN connection request has been received from the camera 200. In a case of determining receipt of a wireless LAN connection request, the CPU 302 performs the processing of S1610. In a case of determining that a wireless LAN connection request has not been received, the CPU 302 determines in S1609 whether a predetermined amount of time has elapsed from having transmission the printer 300 to the direct connection mode (timed out).

In a case of determining that the process has timed out, the CPU 302 returns the printer 300 to the connection mode immediately prior to the simple connection mode and ends the processing. The CPU 302 can display a message indicating that the process has timed out on the display unit 311 at this time. In a case of determining that the process has not timed out, the CPU 302 performs the processing of S1608 again.

In S1610, the CPU 302 determines whether authentication for establishing a wireless LAN connection has been successful. Specifically, the CPU 302 determines whether the received wireless LAN connection request includes an SSID or password for direct connection mode, device information corresponding to the printer 300, and so forth. In a case of determining that that authentication for establishing a wireless LAN connection has been successful, the CPU 302 performs the processing of S1611. In a case of determining that that authentication for establishing a wireless LAN connection has not been successful, the CPU 302 returns the printer 300 to the connection mode immediately prior to the simple connection mode and ends the processing. The CPU 302 can display on the display unit 311 that authentication has not been successful.

In S1611, the CPU 302 establishes a connection with the camera 200 using the connection information for direct connection mode. In S1612, the CPU 302 determines whether a print job has been received from the camera 200. In a case of determining receipt of a print job, the CPU 302 performs the processing of S1614. In a case of determining that a print job has not been received, the CPU 302 determines in S1613 whether a predetermined amount of time has elapsed after having transitioned the printer 300 to the direct connection mode (timed out).

In a case of determining that the process has timed out, the CPU 302 returns the printer 300 to the connection mode immediately prior to the simple connection mode and ends the processing. The CPU 302 can display a message indicating that the process has timed out on the display unit 311 at this time. In a case of determining that the process has not timed out, the CPU 302 performs the processing of S1612 again.

In S1614, the CPU 302 executes print processing based on the received print job. In S1615, the CPU 302 cuts off the connection with the camera 200, returns the printer 300 to the connection mode immediately prior to the simple connection mode, and ends the processing.

FIG. 17 is a flowchart illustrating processing that the camera 200 executes in the present embodiment. The processing illustrated in this flowchart is, for example, realized by the CPU 202 reading out various types of programs stored in memory such as the ROM 203 to the RAM 204 and executing the programs. The processing in the flowchart in FIG. 17 is started in a state where the image selection screen for selecting image data for the printer 300 to print is displayed on the display unit 209.

The processing from S1701 through S1708 is the same as S1501 through S1508, so description is omitted. In S1709, the CPU 202 acquires an SSID and password for direct connection mode from the printer 300 with which simple connection has been established. In S1710, the CPU 202 detects the beacon that includes the SSID and password for direct connection mode, and transmits a wireless LAN connection request to the printer 300.

In S1711, the CPU 202 establishes a connection with the printer 300 using the connection information for direct connection mode. In S1712, the CPU 202 transmits a print job, including the image data selected in S1701, to the printer 300 with which the connection has been established.

In S1713, the CPU 202 cuts off the connection with the printer 300, returns the connection state of the camera 200 to that immediately before simple connection, and ends the process. The timing of cutting off the direct connection with the printer 300 is not restricted, and can, for example, be a timing when transmission of the print job has completed, a timing when the printer 300 provides notification that the processing of the print job has completed, or the like.

As described above, in the present embodiment, the printer 300 transitions to the simple connection mode, and uses connection information for simple connection mode to establish a wireless LAN connection with the camera 200. The printer 300 then causes the camera 200 to newly acquire connection information for direct connection mode via the connection established by the connection information for simple connection mode. Accordingly, the camera 200 can be made to, for example, newly acquire connection information for direct connection mode (highly secure connection information that a third party cannot know) without user input of SSID or password. Accordingly, user operations for establishing a wireless LAN connection can be omitted in the present embodiment, thereby improving user operability.

In a case of operating in the direct connection mode, the printer 300 operates as an access point that can be connected to by connection information operationally settable by the user. That is, only the user that performed the settings and a terminal device that connected to the printer 300 via simple connection can know the connection information optionally set by the user. Accordingly, in a case where the printer 300 is in the direct connection mode, connection with other unintended terminal devices can be suppressed.

The connection information for the direct connection mode is not changed in the present embodiment unless the user changes the settings. Accordingly, a terminal device that established a direct connection with the printer 300 even once can perform direct connection without going through connection is the access point for simple connection mode, as long as this connection information for direct connection is stored. That is, a terminal device that previously established a direct connection with the printer 300 can omit the connection with the access point for simple connection mode and can quickly transmit the job, thereby improving usefulness for the user.

The timing at which the access point for direct connection is enabled in the present embodiment is not restricted to the timing at which connection information for direct connection mode has been exchanged by simple connection. The timing can be the timing at which the power of the printer 300 goes on, or can be the timing at which a predetermined operation is performed to enable the access point for direct connection. Also, the timing at which the access point for direct connection is disabled is not restricted to the timing at which the direct connection is cut off. The timing can be the timing at which the power of the printer 300 goes off, or can be the timing at which an operation to disable the access point for direct connection has been performed.

Other Embodiments

While the above-described embodiments have discussed that connection information for simple connection mode is previously stored in a terminal device's memory such as ROM before the terminal devices are shipped from the manufacturer. The stored connection information for simple connection mode can be associated with a program such as an application installed in the terminal device or the like. For example, a terminal device such as a smartphone or the like use a dedicated application (hereinafter "dedicated app") corresponding to a communication device in order to transmit a print job to the communication device. In this case, by associating the connection information for simple connection mode with this dedicated app, the terminal device can acquire the connection information for simple connection mode when installing the dedicated app. When transmitting the print job to the communication device via the dedicated app, the terminal device can easily connect with the communication device by communicating using the acquired the connection information for simple connection mode, without having to accept input of the connection information from the user.

While the above-described embodiments discussed a case where a communication instruction for image data was accepted from a user and image data was transmitted thereafter without accepting user input, this arrangement is not restrictive. For example, after a communication instruction for image data is accepted from the user, such as user confirmation after connection between devices has been established, the image data can be transmitted through some sort of user operation.

While the above-described embodiments discussed that transmission of a print job from the terminal device to a communication device, this arrangement is not restrictive. For example, transmission can be of a scan job to cause the communication device to perform a scan, a copy job to cause the printer 300 to perform a copy, a settings change command to change settings of the communication device, transmission of images, documents, moving image data, and so forth, to be saved in the communication device, and the like.

In a case where a scan job is transmitted to the communication device, the image data generated by scanning an original document based on the scan job is transmitted to the terminal device by connection information for one-time connection mode or direct connection mode. For example, a scan job is transmitted to the communication device upon the CPU 202 detecting user selection of a scan execution button (omitted from illustration), i.e., acceptance of a communication instruction for image data.

The order of processes of the flowcharts in the above-described embodiments can be changed as long as the effects of the above described-embodiments are realized. Some of the processes can be omitted and the contents of the processing can be changed as applicable.

The above described-embodiments can be realized by supplying a program that realizes one or more functions of the above-described embodiments to a system or device via a network or storage medium, with one or more processors in a computer of the system or device executing the program. The above-described embodiments can also be realized by a circuit realizing one or more functions (e.g., an application specific integrated circuit (ASIC)).

According to the above-described embodiments, user operability can be improved in operations to execute communication of image data between a communication device and terminal device.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-088544 and 2016-088545 filed Apr. 26, 2016, which are hereby incorporated by reference herein in their entirety.

What is claimed is:

1. A control method of a terminal device that accepts operations from a user and stores, without accepting user input of predetermined connection information and without acquiring the predetermined connection information from a communication device, the predetermined connection information, and communicates with a communication device using the stored predetermined connection information, the method comprising:
   connecting the terminal device and the communication device using the stored predetermined connection information;
   acquiring particular connection information different from the stored predetermined connection information from the communication device by connection between the terminal device and the communication device using the stored predetermined connection information;
   connecting, in a case where the communication device is in a state where connection can be performed using the particular connection information, the terminal device and the communication device using the acquired particular connection information;
   communicating, after the communication device and the terminal device are in communication by the stored predetermined connection information, image data with the communication device by the connection between the terminal device and the communication device using the particular connection information,
   wherein a communication method used for establishing a connection using the stored predetermined connection information and a communication method used for establishing a connection using the particular connection information are the same;
   wherein the stored predetermined connection information includes at least information that the user cannot optionally change;
   and wherein the particular connection information acquired via the connection by the stored predetermined connection information is connection information that can be used for connection between the terminal device and the communication device only once.

2. The control method according to claim 1,
   wherein the stored predetermined connection information includes an SSID or a password.

3. The control method according to claim 1,
wherein the stored predetermined connection information is stored before a first activation of the terminal device.

4. The control method according to claim 1,
wherein the stored predetermined connection information is stored in a case where a predetermined program is installed in the terminal device.

5. The control method according to claim 1,
wherein communication of the image data with the communication device is executed by communication between the terminal device and the communication device using the stored predetermined connection information.

6. The control method according to claim 1,
wherein, in a case where communication of the image data with the communication device has completed, the connection between the terminal device and the communication device is cut off,
and wherein, in a case where communication of the image data with the communication device has completed, a state of the communication device where communication can be made using the stored predetermined connection information is released.

7. The control method according to claim 6,
wherein in a case image formation processing by the communication device based on the transmitted image data has completed, the connection between the terminal device and the communication device is cut off,
and wherein, in a case where the communication device completes the image formation processing, the state of the communication device where communication can be made using the stored predetermined connection information is released.

8. The control method according to claim 6, further comprising:
storing information relating to a connection state of the terminal device before the terminal device connected to the communication device using the stored predetermined connection information; and
transitioning, in a case where the connection between the terminal device and the communication device has been cut off, the terminal device to a connection state before the terminal device connected to the communication device using the stored predetermined connection information, based on the stored information.

9. The control method according to claim 1,
wherein communication of the image data includes transmitting the image data and a print job to cause the communication device to execute printing based on the image data.

10. The control method according to claim 1,
wherein the communication of the image data includes transmitting a scan job to cause the communication device to execute scanning and receiving, from the communication device, the image data generated by the scanning.

11. The control method according to claim 1,
wherein communication of the image data includes transmitting image data to be saved by the communication device.

12. The control method according to claim 1,
wherein newly acquired particular connection information is information of a content different from the particular connection information previously acquired from the communication device by connection between the terminal device and the communication device using the stored predetermined connection information.

13. The control method according to claim 1,
wherein the particular connection information is information randomly generated by the communication device.

14. The control method according to claim 13,
wherein the communication device randomly generates the information based on time synchronization.

15. The control method according to claim 1,
wherein the particular connection information includes at least one of an SSID of the communication device in a state where connection can be performed using the particular connection information or a password of the communication device in a state where connection can be performed using the particular connection information.

16. A non-transitory computer-readable storage medium storing computer executable instructions that cause a computer of a terminal device that accepts operations from a user and stores, without accepting user input of predetermined connection information and without acquiring the predetermined connection information from a communication device, the predetermined connection information, and communicates with a communication device using the stored predetermined connection information, to execute a method, the method comprising:
connecting the terminal device and the communication device using the stored predetermined connection information;
acquiring particular connection information different from the stored predetermined connection information from the communication device by connection between the terminal device and the communication device using the stored predetermined connection information;
connecting, in a case where the communication device is in a state where connection can be performed using the particular connection information, the terminal device and the communication device using the acquired particular connection information;
communicating, after the communication device and the terminal device are in communication by the stored predetermined connection information, image data with the communication device by the connection between the terminal device and the communication device using the particular connection information,
wherein a communication method used for establishing a connection using the stored predetermined connection information and a communication method used for establishing a connection using the particular connection information are the same;
wherein the stored predetermined connection information includes at least information that the user cannot optionally change; and
wherein the particular connection information acquired via the connection by the stored predetermined connection information is connection information that can be used for connection between the terminal device and the communication device only once.

17. The non-transitory computer-readable storage medium according to claim 16, wherein the stored predetermined connection information is stored in a case where the computer-executable instructions are installed in the terminal device.

18. A control method of a system including a terminal device and a communication device, where the terminal device stores, without accepting user input of predetermined connection information and without acquiring the predetermined connection information from a communication device, the predetermined connection information;

the control method comprising:
- accepting, at the terminal device, operations from a user;
- communicating, by the terminal device with the communication device, using the stored predetermined connection information;
- acquiring particular connection information different from the stored predetermined connection information from the communication device by connection between the terminal device and the communication device using the stored predetermined connection information;
- activating, by the communication device in a case where a predetermined operation is performed at the communication device by the user, an access point that connects with the terminal device by the predetermined connection information;
- connecting, in a case where the communication device is in the predetermined state where connection can be performed using the particular connection information, the terminal device and the communication device via the access point using the acquired particular connection information; and
- communicating, after the communication device and the terminal device are in communication by the stored predetermined connection information, image data between the terminal device and the communication device after connection using the stored predetermined using the particular connection information, wherein a communication method used for establishing a connection using the stored predetermined connection information and a communication method used for establishing a connection using the particular connection information are the same;

wherein the stored predetermined connection information includes at least information that the user cannot optionally change, and wherein the particular connection information acquired via the connection by the stored predetermined connection information is connection information that can be used for connection between the terminal device and the communication device only once.

19. The control method according to claim 1, wherein the communication method used for establishing the connection using the stored predetermined connection information and the communication method used for establishing the connection using the particular connection information are Wi-Fi.

* * * * *